US012775589B2

(12) United States Patent
Milojkovic

(10) Patent No.: US 12,775,589 B2
(45) Date of Patent: Oct. 27, 2026

(54) SYSTEM AND METHOD FOR BUILDING REPRESENTATION MARKUP HYPERGRAPH AND CONCURRENT MULTI-USER ACCESS THERETO

(71) Applicant: Aleksandar Milojkovic, Vancouver (CA)

(72) Inventor: Aleksandar Milojkovic, Vancouver (CA)

( * ) Notice: Subject to any disclaimer, the term of this patent is extended or adjusted under 35 U.S.C. 154(b) by 0 days.

(21) Appl. No.: 18/843,188

(22) PCT Filed: Feb. 28, 2023

(86) PCT No.: PCT/CA2023/050258
§ 371 (c)(1),
(2) Date: Aug. 30, 2024

(87) PCT Pub. No.: WO2023/164762
PCT Pub. Date: Sep. 7, 2023

(65) Prior Publication Data

US 2025/0181556 A1 Jun. 5, 2025

Related U.S. Application Data

(60) Provisional application No. 63/315,702, filed on Mar. 2, 2022.

(51) Int. Cl.
*G06F 16/00* (2019.01)
*G06F 16/11* (2019.01)
*G06F 16/176* (2019.01)

(52) U.S. Cl.
CPC ........ *G06F 16/1767* (2019.01); *G06F 16/116* (2019.01)

(58) Field of Classification Search
None
See application file for complete search history.

(56) References Cited

U.S. PATENT DOCUMENTS

2010/0318963 A1 12/2010 Kajiya
2014/0033069 A1 1/2014 Chegini et al.
(Continued)

OTHER PUBLICATIONS

Besta, et al., "Demystifying Graph Databases: Analysis and Taxonomy of Data Organization, System Designs, and Graph Queries". Oct. 20, 2019, pp. 1 to 38. Retrieved at URL: <https://arxiv.org/abs/1910.09017vl>.

(Continued)

*Primary Examiner* — Tuankhanh D Phan
(74) *Attorney, Agent, or Firm* — McMillan LLP

(57) ABSTRACT

Methods and systems for providing concurrent multi-user access to a building representation markup hypergraph, the methods comprising: receiving a building representation; generating a processed building representation from the building representation; receiving building representation markup data; generating a hypergraph based at least in part on the processed building representation and the representation markup data, wherein the hypergraph comprises a graph triple-store database; receiving a first access request from a first user; in response to receiving the first access request, providing access to the hypergraph to the first user; receiving a second access request from a second user; and in response to receiving the second access request, providing access to the hypergraph to the second user concurrent with providing access to the hypergraph to the first user.

19 Claims, 15 Drawing Sheets

(56) References Cited

U.S. PATENT DOCUMENTS

| | | | | |
|---|---|---|---|---|
| 2017/0052680 | A1* | 2/2017 | Chegini | G06F 3/04845 |
| 2022/0292543 | A1* | 9/2022 | Henderson | G06Q 30/0252 |

OTHER PUBLICATIONS

Hasan, et al, "A Scalable Parallel Hypergraph Generator (HyGen)", ACM SIGKDD 2020—The 16th International Workshop on Mining and Leaming with Graphs (MLG), San Diego, CA—pp. 1 to 8. Retrieved at URL:<:https://www.ornl.gov/publication/scalable-parallel-hypergraph-generator-hygen>.

Masmoudi, et al, "Knowledge hypergraph-based approach for data integration and querying: Application to Earth Observation", Future Generation Computer Systems, vol. 115, Feb. 2021 (Feb. 2021), pp. 1 to 18. Retrieved at URL: <https:/ /www .sciencedirect.com/science/article/abs/pii/SOI 6773 9X203 I I 96 I>.

Shen, et al., "A Graph-based RDF Triple Store", 2015 IEEE 31st International Conference on Data Engineering, Apr. 13-17, 2015 (Apr. 13-17, 2015), pp. 1 to 4.

* cited by examiner

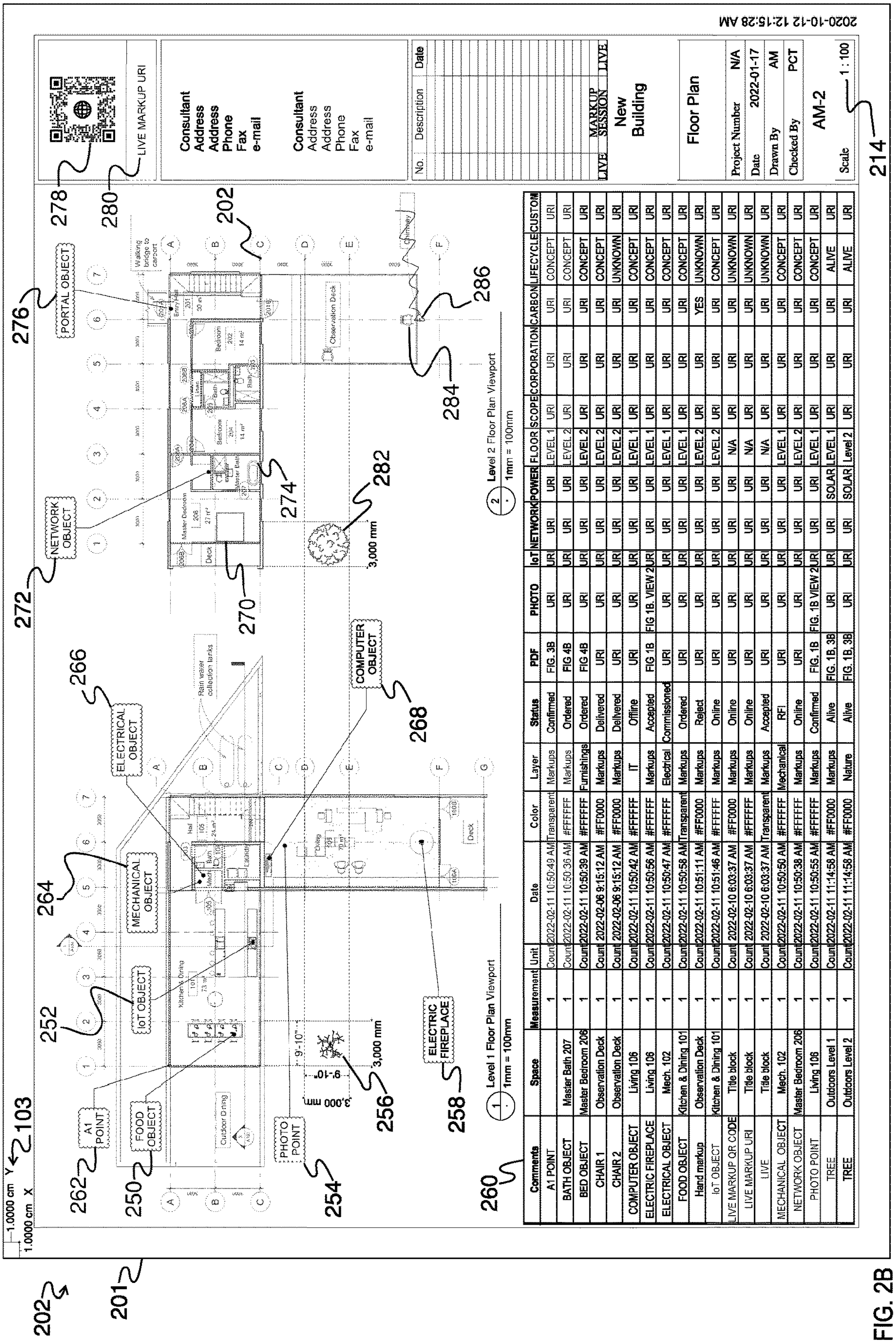

| Comments | Space | Measurement | Unit | Date | Color | Layer | Status | PDF | PHOTO | IoT | NETWORK | POWER | FLOOR | SCOPE | CORPORATION | CARBON | LIFECYCLE | CUSTOM |
|---|---|---|---|---|---|---|---|---|---|---|---|---|---|---|---|---|---|---|
| A1 POINT | | 1 | Count | 2022-02-11 10:50:49 AM | Transparent | Markups | Confirmed | FIG. 3B | URI | URI | URI | URI | LEVEL 1 | URI | URI | URI | CONCEPT | URI |
| BATH OBJECT | Master Bath 207 | 1 | Count | 2022-02-11 10:50:36 AM | #FFFFFF | Markups | Ordered | FIG 4B | URI | URI | URI | URI | LEVEL 2 | URI | URI | URI | CONCEPT | URI |
| BED OBJECT | Master Bedroom 206 | 1 | Count | 2022-02-11 10:50:39 AM | #FFFFFF | Furnishings | Ordered | FIG 4B | URI | URI | URI | URI | LEVEL 2 | URI | URI | URI | CONCEPT | URI |
| CHAIR 1 | Observation Deck | 1 | Count | 2022-02-06 9:15:12 AM | #FF0000 | Markups | Delivered | URI | URI | URI | URI | URI | LEVEL 2 | URI | URI | URI | CONCEPT | URI |
| CHAIR 2 | Observation Deck | 1 | Count | 2022-02-06 9:15:12 AM | #FF0000 | Markups | Delivered | URI | URI | URI | URI | URI | LEVEL 2 | URI | URI | URI | UNKNOWN | URI |
| COMPUTER OBJECT | Living 106 | 1 | Count | 2022-02-11 10:50:42 AM | #FFFFFF | IT | Offline | URI | URI | URI | URI | URI | LEVEL 1 | URI | URI | URI | CONCEPT | URI |
| ELECTRIC FIREPLACE | Living 106 | 1 | Count | 2022-02-11 10:50:56 AM | #FFFFFF | Markups | Accepted | FIG 1B | FIG 1B. VIEW 2 | URI | URI | URI | LEVEL 1 | URI | URI | URI | CONCEPT | URI |
| ELECTRICAL OBJECT | Mech. 102 | 1 | Count | 2022-02-11 10:50:47 AM | #FFFFFF | Electrical | Commissioned | URI | URI | URI | URI | URI | LEVEL 1 | URI | URI | URI | CONCEPT | URI |
| FOOD OBJECT | Kitchen & Dining 101 | 1 | Count | 2022-02-11 10:50:58 AM | Transparent | Markups | Ordered | URI | URI | URI | URI | URI | LEVEL 1 | URI | URI | URI | CONCEPT | URI |
| Hand markup | Observation Deck | 1 | Count | 2022-02-11 10:51:11 AM | #FF0000 | Markups | Reject | URI | URI | URI | URI | URI | LEVEL 2 | URI | URI | YES | UNKNOWN | URI |
| IoT OBJECT | Kitchen & Dining 101 | 1 | Count | 2022-02-11 10:51:46 AM | #FFFFFF | Markups | Online | URI | URI | URI | URI | URI | LEVEL 2 | URI | URI | URI | CONCEPT | URI |
| LIVE MARKUP QR CODE | Title block | 1 | Count | 2022-02-10 6:03:37 AM | #FF0000 | Markups | Online | URI | URI | URI | URI | URI | N/A | URI | URI | URI | UNKNOWN | URI |
| LIVE MARKUP URI | Title block | 1 | Count | 2022-02-10 6:03:37 AM | #FFFFFF | Markups | Online | URI | URI | URI | URI | URI | N/A | URI | URI | URI | UNKNOWN | URI |
| LIVE | Title block | 1 | Count | 2022-02-10 6:03:37 AM | Transparent | Markups | Accepted | URI | URI | URI | URI | URI | N/A | URI | URI | URI | UNKNOWN | URI |
| MECHANICAL OBJECT | Mech. 102 | 1 | Count | 2022-02-11 10:50:50 AM | #FFFFFF | Mechanical | RFI | URI | URI | URI | URI | URI | LEVEL 1 | URI | URI | URI | CONCEPT | URI |
| NETWORK OBJECT | Master Bedroom 206 | 1 | Count | 2022-02-11 10:50:38 AM | #FFFFFF | Markups | Online | URI | URI | URI | URI | URI | LEVEL 2 | URI | URI | URI | CONCEPT | URI |
| PHOTO POINT | Living 106 | 1 | Count | 2022-02-11 10:50:55 AM | #FFFFFF | Markups | Confirmed | FIG. 1B | FIG. 1B VIEW 2 | URI | URI | URI | LEVEL 1 | URI | URI | URI | CONCEPT | URI |
| TREE | Outdoors Level 1 | 1 | Count | 2022-02-11 11:14:58 AM | #FF0000 | Markups | Alive | FIG. 1B, 3B | URI | URI | URI | SOLAR | LEVEL 1 | URI | URI | URI | ALIVE | URI |
| TREE | Outdoors Level 2 | 1 | Count | 2022-02-11 11:14:58 AM | #FF0000 | Nature | Alive | FIG. 1B, 3B | URI | URI | URI | SOLAR | Level 2 | URI | URI | URI | ALIVE | URI |

FIG. 2B 300
301

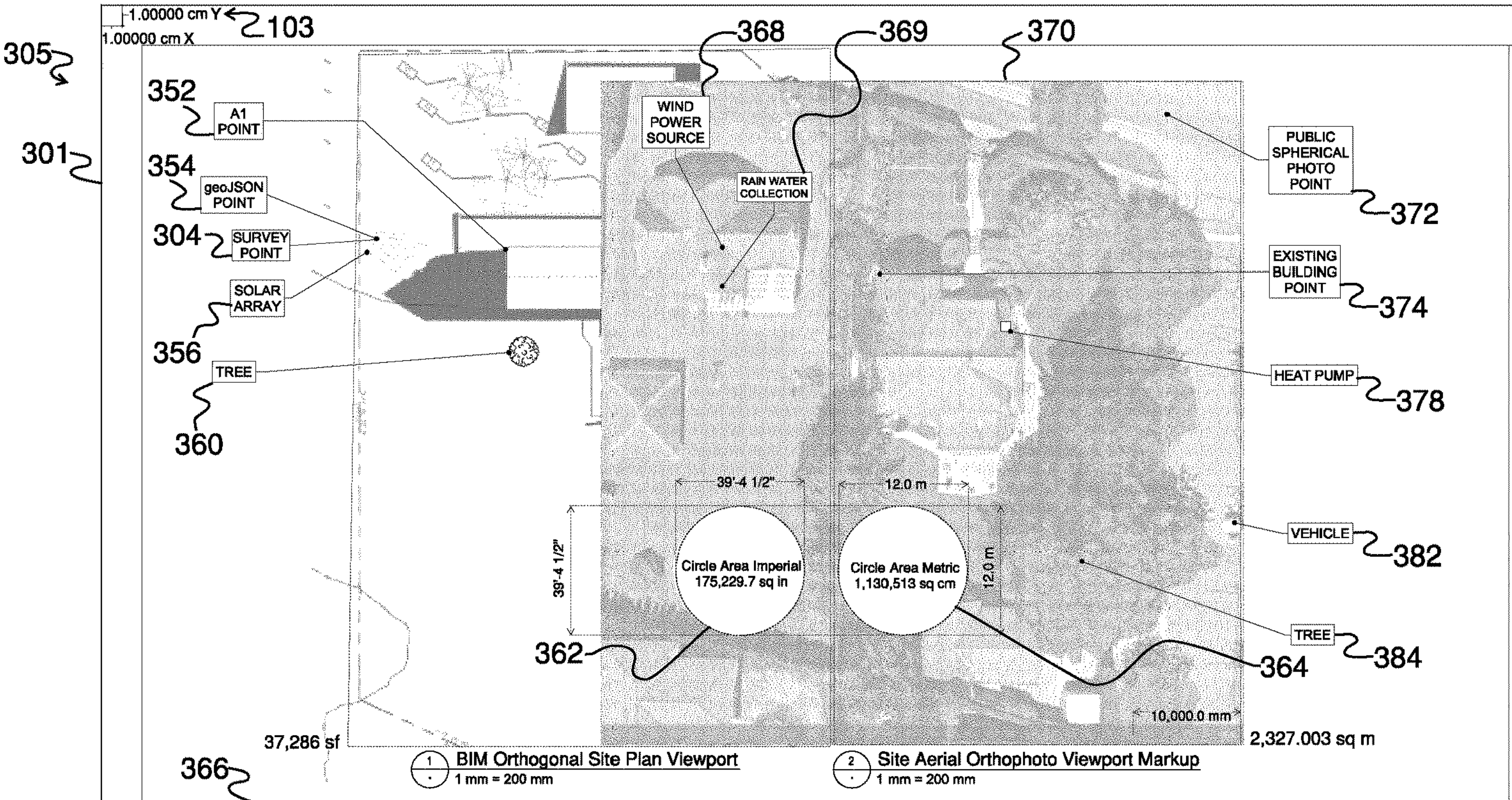

| Comments | Space | Measurement | Unit | Date | Color | Layer | Status | PDF | PHOTO | IoT | NETWORK | POWER | BIM | SCOPE | CORPORATION | CARBON | LIFECYCLE | CUSTOM |
|---|---|---|---|---|---|---|---|---|---|---|---|---|---|---|---|---|---|---|
| 10,000.0 mm | Aerial Camera Site 1:200 View | 10,000.0 | mm | 2023-02-20 4:02:27 PM | #000000 | Markups | Calibrated | URI | URII | URI | URI | URI | URI | URI | URI | URI | UNKNOWN | URI |
| A1 POINT | BIM Site 1:200 View | 1 | Count | 2023-02-20 4:05:43 PM | Transparent | BIM | Confirmed | FIG. 2B | URI | URI | URI | URI | URI | URI | URI | URI | UNKNOWN | URI |
| Circle Area Metric 1,130,513 sq cm | Aerial Camera Site 1:200 View | 1,130,513.0 | sq cm | 2023-02-20 4:02:27 PM | #000000 | ORTHOPHOTO | Ordered | URI | URI | URI | URI | SOLAR | URI | URI | URI | URI | UNKNOWN | URI |
| EXISTING BUILDING POINT | Aerial Camera Site 1:200 View | 1 | Count | 2023-02-20 4:06:12 PM | Transparent | GIS | Confirmed | FIG. 4B | URI | URI | URI | URI | URI | URI | URI | URI | UNKNOWN | URI |
| geoJSON POINT | BIM Site 1:200 View | 1 | Count | 2023-02-20 4:05:38 PM | Transparent | GIS | Confirmed | FIG. 2B | URI | URI | URI | URI | URI | URI | URI | URI | UNKNOWN | URI |
| HEAT PUMP | Aerial Camera Site 1:200 View | 1 | Count | 2023-02-20 4:06:16 PM | Transparent | Mechanical | Ordered | URI | FIG.8B | URI | URI | URI | URI | URI | URI | URI | UNKNOWN | URI |
| LIVE MARKUP QR CODE | Title block | 1 | Count | 2023-02-20 4:02:23 PM | #000000 | Markups | Online | URI | URI | URI | URI | URI | URI | URI | URI | URI | UNKNOWN | URI |
| PUBLIC SPHERICAL PHOTO POINT | Aerial Camera Site 1:200 View | 1 | Count | 2023-02-20 4:06:09 PM | Transparent | ORTHOPHOTO | Online | URI | URI | URI | URI | URI | URI | URI | URI | URI | UNKNOWN | URI |
| SOLAR ARRAY | BIM Site 1:200 View | 1 | Count | 2023-02-20 4:05:34 PM | Transparent | Electrical | Quantified | FIG. 1B | URI | URI | URI | SOLAR | URI | URI | URI | URI | CONCEPT | URI |
| TREE | Aerial Camera Site 1:200 View | 1 | Count | 2023-02-20 4:06:25 PM | Transparent | Nature | Confirmed | URI | URI | URI | URI | SOLAR | URI | URI | URI | URI | ALIVE | URI |
| TREE | BIM Site 1:200 View | 1 | Count | 2023-02-20 4:03:51 PM | Transparent | Nature | Quantified | FIG. 1B, 2B | URI | URI | URI | SOLAR | URI | URI | URI | URI | MARKUP | URI |
| VEHICLE | Aerial Camera Site 1:200 View | 1 | Count | 2023-02-20 4:06:20 PM | Transparent | ORTHOPHOTO | Maintenance Issue | URI | URI | URI | URI | URI | URI | URI | URI | YES | UNKNOWN | URI |

LIVE MARKUP URI

Consultant
Address
Address
Phone
Fax
e-mail

Consultant
Address
Address
Phone
Fax
e-mail

| No. | Description | Date |
|---|---|---|

LIVE Markup LIVE

New Building

Site Plan

Project number 001-00
Date Issue Date
Drawn by AM
Checked by PCT

AM-3

Scale 1 : 200

306

2020-10-12 12:15:28 AM

FIG. 3B

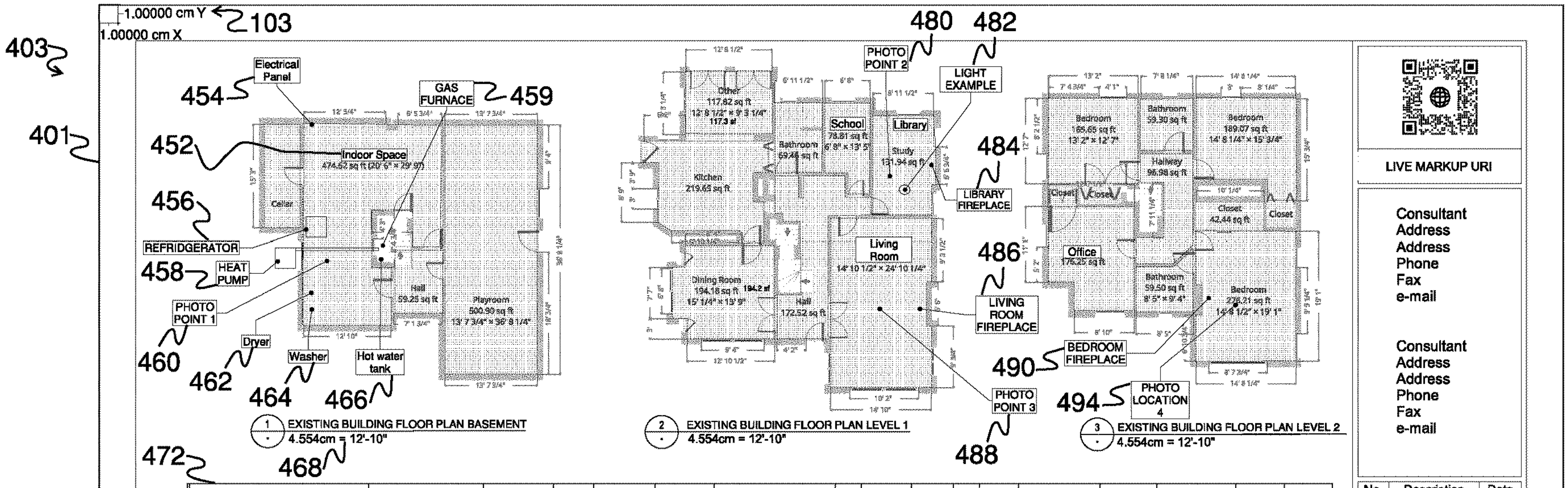

| Comments | Space | Measurement | Unit | Color | Layer | Status | PDF | PHOTO | POWER | IoT | SCOPE | CORPORATION | NETWORK | FLOOR | CARBON | CUSTOM |
|---|---|---|---|---|---|---|---|---|---|---|---|---|---|---|---|---|
| BEDROOM FIREPLACE | Bedroom 2 | 1 | Count | #FFFFFF | Markups | Electrify | URI | FIG. 7B | URI | URI | URI | URI | URI | LEVEL 2 | YES | URI |
| Dryer | Indoor Space | 1 | Count | #FFFFFF | Markups | Online | URI | FIG. 8B | URI | URI | URI | URI | URI | BASEMENT | NO | URI |
| Electrical Panel | Indoor Space | 1 | Count | #FFFFFF | Markups | Online | URI | FIG. 8B | URI | URI | URI | URI | URI | BASEMENT | NO | URI |
| GAS FURNACE | Mechanical Room | 1 | Count | #FFFFFF | Markups | Electrify | URI | FIG. 8B | URI | URI | URI | URI | URI | BASEMENT | YES | URI |
| HEAT PUMP | Outdoors | 1 | Count | #FFFFFF | Markups | Ordered | URI | FIG. 8B | URI | URI | URI | URI | URI | LEVEL 1 | NO | URI |
| Hot water tank | Mechanical Room | 1 | Count | #FFFFFF | Markups | Not Confirmed | URI | FIG. 8B | URI | URI | URI | URI | URI | BASEMENT | YES | URI |
| LIBRARY FIREPLACE | Library | 1 | Count | #FFFFFF | Markups | Electrify | URI | URI | URI | URI | URI | URI | URI | LEVEL 1 | URI | URI |
| LIGHT EXAMPLE | Library | 1 | Count | #FFFFFF | Electrical | Online | URI | FIG.5B | URI | URI | URI | URI | URI | LEVEL 1 | URI | URI |
| LIVING ROOM FIREPLACE | Living Room | 1 | Count | #FFFFFF | Markups | Electrify | URI | FIG. 6B | URI | URI | URI | URI | URI | LEVEL 1 | YES | URI |
| PHOTO LOCATION 4 | Bedroom 2 | 1 | Count | #FFFFFF | Markups | Online | URI | FIG. 7B | URI | URI | URI | URI | URI | LEVEL 2 | URI | URI |
| PHOTO POINT 1 | Indoor Space | 1 | Count | #FFFFFF | Markups | Online | URI | FIG. 8B | URI | URI | URI | URI | URI | BASEMENT | URI | URI |
| PHOTO POINT 2 | Library | 1 | Count | #FFFFFF | Markups | Online | URI | FIG. 5B | URI | URI | URI | URI | URI | LEVEL 1 | URI | URI |
| PHOTO POINT 3 | Living Room | 1 | Count | #FFFFFF | Markups | Online | URI | FIG. 6B | URI | URI | URI | URI | URI | LEVEL 1 | URI | URI |
| REFRIDGERATOR | Indoor Space | 1 | Count | #FFFFFF | Markups | Quantified | URI | FIG. 8B | URI | URI | URI | URI | URI | BASEMENT | NO | URI |
| Washer | Indoor Space | 1 | Count | #FFFFFF | Markups | Maintenance Issue | URI | FIG. 8B | URI | URI | URI | URI | URI | BASEMENT | NO | URI |

FIG. 4B

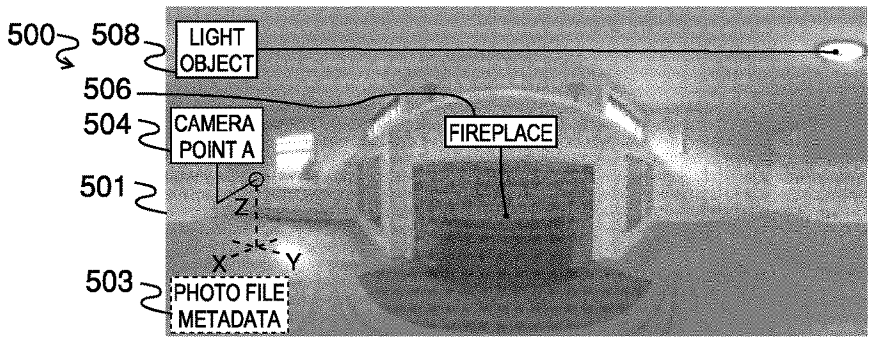

FIG. 5B

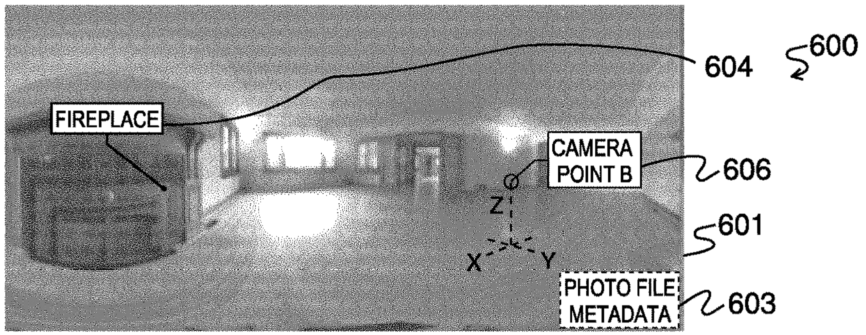

FIG. 6B

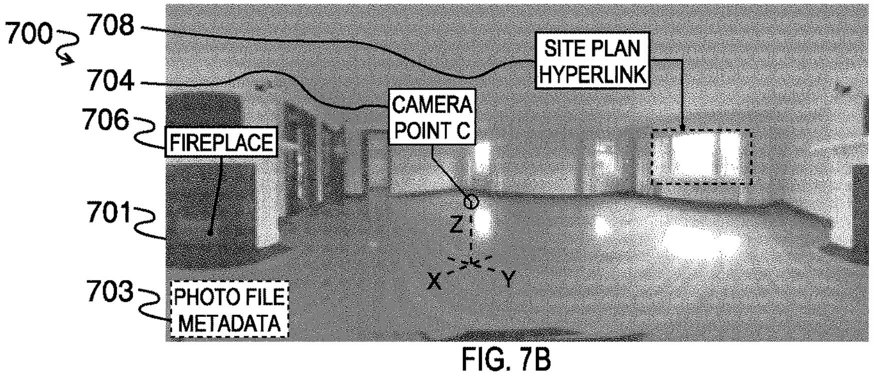

FIG. 7B

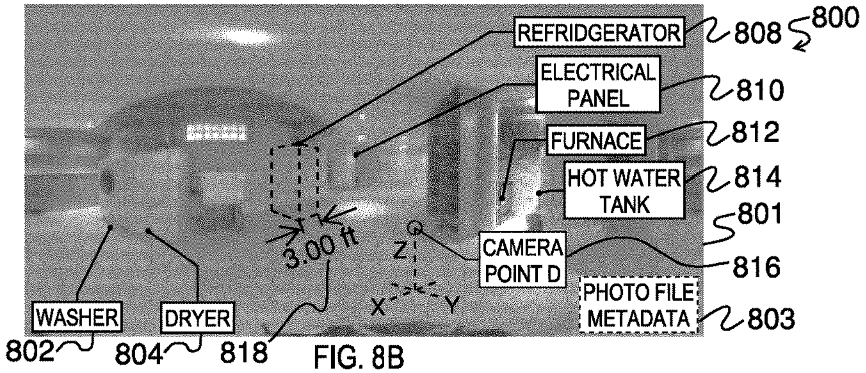

FIG. 8B

900

902

| Comments | Space | Measurement | Unit | Layer | Status | PDF | PHOTO | IoT | NETWORK | POWER | BIM | SCOPE | CORPORATION | FLOOR | CARBON | LIFECYCLE | CUSTOM |
|---|---|---|---|---|---|---|---|---|---|---|---|---|---|---|---|---|---|
| 3.00 ft | Indoor Space | 3.00 | ft | Markups | Quantified | URI | URI | URI | URI | URI | URI | URI | URI | BASEMENT | URI | UNKNOWN | URI |
| CAMERA POINT A | Library | 1 | Count | Markups | Not Confirmed | URI | URI | URI | URI | URI | URI | URI | URI | LEVEL 1 | NO | UNKNOWN | URI |
| CAMERA POINT B | Living Room | 1 | Count | Markups | Not Confirmed | URI | URI | URI | URI | URI | URI | URI | URI | LEVEL 1 | NO | UNKNOWN | URI |
| CAMERA POINT C | Bedroom | 1 | Count | Markups | Not Confirmed | URI | URI | URI | URI | URI | URI | URI | URI | LEVEL 2 | NO | UNKNOWN | URI |
| CAMERA POINT D | Indoor Space | 1 | Count | Markups | Not Confirmed | URI | URI | URI | URI | URI | URI | URI | URI | BASEMENT | NO | UNKNOWN | URI |
| Dryer | Indoor Space | 1 | Count | Markups | Online | FIG. 4B | URIs | URI | URI | URI | URI | URI | URI | BASEMENT | NO | EXISTING | URI |
| FIREPLACE | Bedroom | 1 | Count | Markups | Offline | FIG. 4B | URIs | URI | URI | URI | URI | URI | URI | LEVEL 2 | YES | EXISTING | URI |
| FIREPLACE | Library | 1 | Count | Markups | Offline | FIG. 4B | URIs | URI | URI | URI | URI | URI | URI | LEVEL 1 | YES | EXISTING | URI |
| LIGHT OBJECT | Library | 1 | Count | Markups | Quantified | URI | URIs | URI | URI | URI | URI | URI | URI | LEVEL 1 | YES | EXISTING | URI |
| LIVING ROOM FIREPLACE | Living Room | 1 | Count | Markups | Offline | FIG. 4B | URIs | URI | URI | URI | URI | URI | URI | LEVEL 1 | YES | EXISTING | URI |
| REFRIDGERATOR | Indoor Space | 1 | Count | Markups | | FIG. 4B | URIs | URI | URI | URI | URI | URI | URI | BASEMENT | NO | EXISTING | URI |
| SITE PLAN HYPERLINK | Bedroom | 1 | Count | Markups | Online | FIG. 3B | URIs | URI | URI | URI | URI | URI | URI | LEVEL 2 | YES | UNKNOWN | URI |
| Washer | Indoor Space | 1 | Count | Markups | Maintenance Issue | FIG. 4B | URIs | URI | URI | URI | URI | URI | URI | BASEMENT | NO | EXISTING | URI |

FIG. 9

| | |
|---|---|
| 1100 | FIG. 11A |
| 1101 | USER ADMINISTRATOR |
| 1102 | USER BUILDING PLAN FILE |
| 1103 | USER ADMIN BUILDING PLAN UPLOAD |
| 1104 | USER ADMIN PLAN VIEW SOFTWARE |
| 1105 | USER ADMIN META MODEL PREPARE |
| 1106 | LIVE USER PLAN VIEW SOFTWARE |
| 1107 | USER STATIC METAMODEL COPY DOWNLOAD |
| 1108 | USER PLAN MARKUP EDITOR SOFTWARE |
| 1109 | USER LIVE FILE SHARE |
| 1110 | LIVE USER MARKUP PARALLEL FILE COLLABORATION |
| 1112 | LIVE USER PLAN VIEW SOFTWARE |
| 1113 | USER PLAN MARKUP EDITOR SOFTWARE |
| 1114 | USER PLAN MARKUP MEDIA |
| 1115 | LIVE USER HYPERGRAPH DATA API SERVICE |
| 1116 | PHOTO MARKUP PLAN FILE URI |
| 1117 | SOURCE BUILDING PHOTO UPLOAD |
| 1118 | SOURCE BUILDING PHOTO FILE |
| 1119 | LIVE USER PHOTO VIEW SOFTWARE |
| 1120 | LIVE USER PHOTO MARKUP EDIT SOFTWARE |
| 1121 | USER PHOTO MARKUP MEDIA |
| 1122 | LIVE PLAN-PHOTO HYPERGRAPH SERVICE |
| 1123 | CLOUD PLAN FILE REPOSITORY WITH SOURCE AND VERSION CONTROL |
| 1124 | USER SOURCE BUILDING PLAN FILE |
| 1125 | USER SOURCE PLAN - STATIC PLAN IMAGES |
| 1126 | USER SOURCE PLAN - MARKUP OBJECTS |
| 1127 | USER SOURCE PLAN - FILE METADATA |
| 1128 | USER PLAN FILE FUNCTIONS |
| 1129 | USER METAMODEL PLAN FILE |
| 1130 | USER METAMODEL PLAN - STATIC PLAN IMAGES |
| 1131 | USER METAMODEL PLAN - USER MARKUP OBJECTS |
| 1132 | USER METAMODEL PLAN - MARKUP METAMODEL |
| 1133 | LIVE USER PLAN FILE COLLABORATIVE MARKUP APPLICATION |
| 1134 | USER SOURCE PLAN - STATIC PLAN IMAGE - DATA EXTRACT, TRANSFER, LOAD |
| 1135 | USER SOURCE PLAN - MARKUP OBJECT - DATA EXTRACT, TRANSFER, LOAD |
| 1136 | LIVE BUILDING KNOWLEDGE GRAPH NATIVE DATABASE |
| 1137 | USER SOURCE PLAN - FILE METADATA - DATA EXTRACT, TRANSFER, LOAD |
| 1138 | USER PLAN FILE FUNCTIONS - COPY SOURCE TO METAMODEL FILE |
| 1139 | MARKUP OBJECTS - MARKUPS FILE - DATA EXTRACT, TRANSFER, LOAD |
| 1140 | USER DEFINED PLAN METADATA MODEL |
| 1141 | LIVE USER METAMODEL PLAN FILE |
| 1142 | LIVE USER METAMODEL PLAN FILE - DATA EXTRACT, TRANSFER, LOAD |
| 1143 | LIVE USER METAMODEL PLAN FILE - 2D IMAGE SHEETS |
| 1144 | LIVE USER METAMODEL PLAN FILE - MARKUP OBJECTS |
| 1145 | PLAN MARKUP OBJECT - PHOTO URI |
| 1146 | LIVE USER METAMODEL PLAN FILE - MARKUP METAMODEL |
| 1147 | LIVE USER METAMODEL PLAN FILE - MARKUP APP PLAN OBJECTS |
| 1148 | LIVE USER METAMODEL PLAN FILE - MARKUP APP PLAN OBJECTS - DATA EXTRACT, TRANSFER, LOAD |
| 1149 | GRAPHQL API AND REST API |
| 1150 | LIVE USER PHOTO FILE COLLABORATIVE MARKUP APPLICATION |
| 1151 | LIVE USER SOURCE PHOTO |
| 1152 | LIVE USER PHOTO FILE COLLABORATIVE MARKUP APPLICATION - DATA EXTRACT, TRANSFER, LOAD |
| 1153 | LIVE USER SOURCE PHOTO - STATIC PHOTO IMAGE |
| 1154 | LIVE USER SOURCE PHOTO - STATIC PHOTO IMAGE - DATA EXTRACT, TRANSFER, LOAD |
| 1155 | LIVE USER SOURCE PHOTO - FILE METADATA - DATA EXTRACTION |
| 1156 | LIVE USER SOURCE PHOTO - FILE METADATA |
| 1157 | LIVE USER PHOTO MARKUP APPLICATION METAMODEL - DATA EXTRACT, TRANSFER, LOAD |
| 1158 | LIVE USER PHOTO MARKUP APPLICATION METAMODEL - DATA EXTRACT, TRANSFER, LOAD |
| 1159 | MARKUP APPLICATION PHOTO OBJECTS - DATA EXTRACT, TRANSFER, LOAD |
| 1160 | LIVE USER PHOTO FILE COLLABORATIVE APPLICATION - MARKUP APP PHOTO OBJECTS |

FIG. 11B

SYSTEM AND METHOD FOR BUILDING REPRESENTATION MARKUP HYPERGRAPH AND CONCURRENT MULTI-USER ACCESS THERETO

REFERENCE TO RELATED APPLICATIONS

This application claims priority from application No. 63/315,702, filed 2 Mar. 2022. For purposes of the United States, this application claims the benefit under 35 U.S.C. § 119 of application No. 63/315,702, filed 2 Mar. 2022, and entitled SYSTEMS AND METHODS FOR LIVE BUILDING PLAN-PHOTO MARKUP HYPERGRAPH which is hereby incorporated herein by reference for all purposes.

TECHNICAL FIELD

The present disclosure is directed to systems and methods for building plan and/or photograph markup hypergraphs. More particularly, the present disclosure is directed to systems and methods for simultaneous multi-user access to building plan and/or photograph markup hypergraphs.

BACKGROUND

Managing, coordinating, updating and sharing accurate building plan and/or photo files among the various stakeholders involved throughout the full lifecycle of any building asset, such as: owners, planners, builders, facilities managers, lawyers, accountants, consultants, architects, engineers, construction contractors, electrical contractors, mechanical contractors, service suppliers, insurance providers, manufacturers, information technology providers, employees, stakeholders, corporations and/or individuals who may change over time, is a complex problem.

Both unique in its design and uniquely located, each constructed building requires a dynamic network of on-site and off-site professionals, trades, manufacturers, corporations and individuals, which are themselves a unique supply chain for each building. The supply chain for constructed building assets is, therefore, ubiquitous, enormous, and fragmented per building, per contracted firm and often down to the knowledge of an individual within the building space. As a result, managing and updating live building operational plans and photos across a building's life cycle is also a complex and fragmented task. It is highly desirable, therefore, to provide a system and process which overcomes these file management and sharing obstacles.

In prior art systems, either building plans or photo files are static file copies downloaded by each user to their own computing device for individual viewing and editing. The downloading of static file copies fundamentally leads to unmanaged source and version control issues between plan and photo files across building and lifecycle stages. Fragmented plan and photo file management and version control for each building and project is a systemic issue at a global scale for every constructed building and natural asset. It is also desirable, therefore, to provide a combined file service which addresses this issue in a scalable manner for buildings.

As a general matter, each building involves the creation, review, and revision of plan construction drawings and photos between on-site and off-site professionals at many times within its lifecycle. The plan construction drawings may comprise 2D orthogonal scaled images of building geometries, such as an architectural, engineering or a manufacturing blueprint drawing, in which two-dimensional line segments and areas of the drawing sheet represent certain physical elements of the building geometry like walls, rooms, doors, cabling, devices, and real-world objects.

Traditionally, firms within the architecture, engineering and construction (AEC) sector have relied on paper-pen markups on large sized sheets for technical coordination and markup measurements. The next step for improving management of construction projects could be to have on-site and off-site participants involved in a project concurrently online, in real-time by means of 3D CAD/BIM software. In prior art systems, attempts to use multi-user 3D CAD/BIM processes have more often than not been thwarted by large architecture and engineering files which often contain large amounts of static geometry data. Trained architecture and engineering drafting professionals can painstakingly interpret and create construction 3D geometries into 2D plans, in their full context, but conventional users, systems and methods have been largely unable to make use of 3D CAD/BIM files after the construction phase has been completed. It is highly desirable, therefore, to provide a live file system and process service which overcomes these obstacles using industry standard plans and photo files that do not require specialized user software or training.

A PDF file is a standard deliverable plan file format for professional architectural and engineering sheet geometry drawings used as official building construction document deliverables. Plan files are typically printed by architectural and engineering professionals as the plan deliverable output from proprietary 2D/3D CAD/BIM source files. The source 2D/3D construction applications used by architects and engineers to print plan file deliverables may require proprietary software to view and/or edit the information contained within.

At least half of the nearly $10 trillion spent each year globally for construction goes to labour and not materials. The various on-site trades account for much of this. However, a significant portion of the labor is for off-site architecture and engineering professionals to generate building construction plans in plan format. An even greater amount of time and money is spent in finding and interpreting information embedded within building plans between on-site and off-site parties. Accordingly digital building plans and photos are essential technologies of information transfer and integration in the building asset marketplace. It would be highly desirable, therefore, to provide improved software processes for the marketplace that reduces the time and money spent to effectively utilize plans, as well as finding and interpreting and verifying information embedded in those files relative to real-world asset photo conditions.

The final construction plan deliverable from building architects and building engineers at the end of a construction project may be known as an "as-built" or "record" drawing. Record architecture and engineering construction plans are rarely updated after the building construction phase has been completed as the original technical drawing authors were only involved in the construction phase of building lifecycle. The result is that valuable CAD/BIM source file measurement architectural, engineering, and construction data is often lost once the construction phase of a building has ended. It is highly desirable, therefore, to provide a system and process which enables the use of accurate and extensible plan data across all phases of a building including preconstruction, construction and into operations.

Proprietary CAD/BIM software is often not inexpensive in terms of time and cost to many individuals who may be averse to new software. It is also desirable, therefore, to provide file service that is scalable, robust, extensible, and easy-to-use with non-proprietary file formats such as PDF and JPEG.

PDF and JPEG provide realistic fidelity with both paper and digital images. Type, graphics, and color are all reproduced as they are on paper and in the real world as viewed by a digital camera. Even hyperlinks and media types, like images, movies and sounds, can be added to a PDF or JPEG file. PDF and JPEG files are inexpensive to create, and are used by many companies to deliver page-formatted information since the end user gets something that looks very much like paper and photos, therefore training costs are low.

Building plans and photo files for construction are typically static images with no file metadata visible. The result however is that metadata is not typically transmitted within the plan file as a deliverable. It is also desirable, therefore, to provide file service that can utilize file metadata in both a live visual manner and as a shared markup information metamodel data service for a building.

In general, there is no limit to the quantity of building plan files and photos that may be generated through the course of a building lifecycle. An object drawn as a markup on a plan or photo viewport may represent a corresponding real or virtual object.

There is a general desire for a system and/or process that can handle any number of plan, photo, viewports and markups for a building as a continuous file service over its lifecycle.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect of the invention provides a method for providing concurrent multi-user access to a building representation markup hypergraph, the method comprising: receiving a building representation; generating a processed building representation from the building representation; receiving building representation markup data; generating a hypergraph based at least in part on the processed building representation and the representation markup data, wherein the hypergraph comprises a graph triple-store database; receiving a first access request from a first user; in response to receiving the first access request, providing access to the hypergraph to the first user; receiving a second access request from a second user; and in response to receiving the second access request, providing access to the hypergraph to the second user concurrent with providing access to the hypergraph to the first user.

In some embodiments of the present invention, providing access to the hypergraph to the first user comprises providing access with a GraphQL™ application programing interface (API).

In some embodiments of the present invention, providing access to the hypergraph to the second user comprises providing access with the GraphQL™ API.

In some embodiments of the present invention, the building representation comprises a building plan file, and generating the processed building representation comprises: converting the building plan file to a user source plan file; storing the user source plan file in a source-controlled plan file repository; and receiving the building representation markup data comprises: extracting one or more static plan images, one or more markup objects, and file metadata from the user source plan file; extracting one or more relationships between one or more of the static plan images, markup objects, and file metadata; and generating the hypergraph comprises storing the static plan images, the markup objects, the file metadata, and the relationships in the hypergraph.

In some embodiments of the present invention, extracting the static plan images, markup objects, and file metadata from the user source plan file comprises extracting the static plan images, markup objects, and file metadata from the user source plan file with an application program interface (API) script.

In some embodiments of the present invention, extracting the relationships between one or more of the static plan images, markup objects, and file metadata comprises extracting the relationships between one or more of the static plan images, markup objects, and file metadata with the application program interface (API) script.

In some embodiments of the present invention, providing access to the hypergraph to the first user comprises providing access to one or more of the static plan images, markup objects, file metadata, and relationships to the first user; and providing access to the hypergraph to the second user comprises providing access to one or more of the static plan images, markup objects, file metadata, and relationships to the second user.

In some embodiments of the present invention, the first access request comprises a request to edit the markup data, and providing access to the hypergraph to the first user comprises: receiving first updated markup data from the first user; and updating one or more of the static plan images, the markup objects, the file metadata, and the relationships based at least in part on the first updated markup data.

In some embodiments of the present invention, the second access request comprises a request to edit the markup data, and providing access to the hypergraph to the second user comprises: receiving second updated data from the second user; and updating one or more of the static plan images, the markup objects, the file metadata, and the relationships based at least in part on the second updated markup data.

In some embodiments of the present invention, providing access to the hypergraph to the first user comprises: generating a user metamodel plan file from the building representation; storing the user metamodel plan file in a cloud file storage repository; and providing access to the first user to the user metamodel plan file.

Some embodiments of the present invention further comprise: generating one or more metadata models from the user metamodel plan file using one or move plan file functions; generating one or more markup objects from the building representation markup data; and adding each of the markup objects to the user metamodel plan file; wherein providing access to the hypergraph to the first user comprises providing access to one or more of the markup objects to the first user.

In some embodiments of the present invention, providing access to the markup objects to the first user comprises: receiving updated markup data from the first user; updating one or more of the markup objects based at least in part on the updated markup data to generate updated markup objects; and updating the hypergraph based at least in part on the updated markup objects.

In some embodiments of the present invention, providing access to the hypergraph to the second user comprises providing access to the second user to the user metamodel plan file.

In some embodiments of the present invention, providing access to the hypergraph to the second user comprises providing access to one or more of the markup objects to the second user.

In some embodiments of the present invention, providing access to the markup objects to the second user comprises: receiving updated markup data from the second user; updating one or more of the markup objects based at least in part on the updated markup data to generate updated markup objects; and updating the hypergraph based at least in part on the updated markup objects.

In some embodiments of the present invention, the building representation comprises one or more of: a building plan file, and a building photograph file.

In some embodiments of the present invention, the hypergraph comprises one or more of: a static plan image; a markup stream object, wherein the object comprises a document geometry and a property value; a markup properties model; a space polygon area model; a viewport scale model; a page label model; and a page geometry model.

In some embodiments of the present invention, the markup objects comprise one or more of: real-world environment plans; real-world environment photos; virtual-world assets plans; virtual-world assets photos; mobile machine plans; mobile machine photos; scientific plans; scientific photos; engineering plans; engineering photos; economic plans; economic photos; hardware plans; hardware photos; software plans; software photos; art plans; art photos; technical plans, for example patent applications; and technical photos.

In some embodiments of the present invention, the building representation comprises one or more of: one or more files in an ISO™ standard open format such as portable document format (PDF); legal building geometry drawing viewports created for the purpose of coordinating one or more of: construction, renovation, operation and demolition of one or more of: materials, systems, equipment and objects within existing or new building assets; informal building geometry drawing viewports created for the purpose of coordinating one or more of: construction, renovation, operation and demolition of one or more of: materials, systems, equipment and objects within existing or new building assets; and one or more outputs from building-related professional services or products, including one or more of: building plans and viewports, architecture plans and viewports, surveyor plans and viewports, electrical engineering plans and viewports, mechanical engineering plans and viewports, structural engineering plans and viewports, civil engineering plans and viewports, chemical engineering plans and viewports, scientific plans and viewports, landscape plans and viewports, planning plans and viewports, interior designer plans and viewports, manufacturing plans and viewports, agricultural plans and viewports, medical plans and viewports, aviation plans and viewports, transportation plans and viewports, consultant plans and viewports, general contractor plans and viewports, electrical contractor plans and viewports, mechanical contractor plans and viewports, IoT services plans and viewports, maintenance services plans and viewports, cleaning services plans and viewports, information technologies plans and viewports, and manufacturer plans and viewports.

In some embodiments of the present invention, the hypergraph comprises one or more of: a knowledge graph triplestore database; a human readable graphQL™ application programming interface (API) service; a computer readable graphQL™ application programming interface (API) service; and one or more machine learning models trained on data otherwise stored in the hypergraph.

Some embodiments of the present invention may apply software source and version control efficiencies to one or more building plan and photo files to provide a live user markup collaboration service with a building hypergraph database and graphQL™ API data service.

Some embodiments of the present invention may enable live users to collaborate on the same building deliverable plan and photo files, thereby reducing file synchronization errors associated with individual static file copied for viewing and markup editing.

Some embodiments of the present invention may provide live remote markup collaboration and/or synchronization between off-site and/or on-site building users on the same source controlled plan and/or photo files.

Some embodiments of the present invention may provide a continuous plan and photo file service for one or more building lifecycle phases including: pre-construction, construction, operations and/or demolition.

Some embodiments of the present invention may be deployed and/or administered as-a-service by an individual user administrator who can dynamically manage building plan and/or photo files with a dynamic team of live user markup collaborators.

Some embodiments of the present invention may provide shared transparency and/or analytics across one or more building plan and/or photo files, and one or more collaborative user markups.

Some embodiments of the present invention may be scalable for buildings of one or more sizes, and/or whether existing, new or virtual projects. Some embodiments of the present invention may manage large volumes of files and markups.

Some embodiments of the present invention may improve the efficiency of one or more of: professional building architecture, engineering, construction and operational services, through live shared markup collaboration, data modeling and/or analytics. The ability to collaborate on the same building deliverable plan and/or photo files may be particularly advantageous for multi-disciplinary technical teams.

Some embodiments of the present invention may enable remote construction project automation through live shared plan and photography methods with live feedback.

Some embodiments of the present invention may provide a system for live markup objects and/or markup metadata customization by a user for any object and/or application by means of real-time markup geometries.

Some embodiments of the present invention may be concurrently applied to engineering and/or scientific construction applications of two or more sizes and/or scales.

Some embodiments of the present invention may visually link building and/or site markup geometry and provide the capability to relate previously unrelated information, for example, through the use of plan 2D building geometry points as the "key index variable" to one or more user defined data applications and external application resources.

Some embodiments of the present invention may be used with a game engine entity component system to enable cross-platform software visualizations and/or simulations using a live hypergraph API.

Some embodiments of the present invention may provide a live systems engineering service which provides accurate plan and/or photo file and markup object geometries across existing and/or new buildings on a global scale without the use of CAD/BIM files.

Those skilled in the art will appreciate that the summary is illustrative only and is not intended to be in any way limiting. Other aspects, inventive features, and advantages of the devices and/or processes described herein will become apparent in the detailed description set forth herein and taken in conjunction with the accompanying drawings.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 2B is an example of the New Building Floor Plan depicted in FIG. 2A with markup objects, according to an example embodiment of the present invention.

FIG. 3B is an example of the Site Building Plan depicted in FIG. 3A with markup objects, according to an example embodiment of the present invention.

FIG. 4B is an example of the Existing Building Floor Plan depicted in FIG. 4A with markup objects, according to an example embodiment of the present invention.

FIG. 5B depicts the photo file of FIG. 5A with markup objects, according to an example embodiment of the present invention.

FIG. 6B depicts the photo file of FIG. 6A with markup objects, according to an example embodiment of the present invention.

FIG. 7B depicts the photo file of FIG. 7A with markup objects, according to an example embodiment of the present invention.

FIG. 8B depicts the photo file of FIG. 8A with markup objects, according to an example embodiment of the present invention.

FIG. 9 is a markup summary of photo markups from FIGS. 5B, 6B, 7B and 8B.

FIG. 11B is a numbering summary of FIG. 11A.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

According to an example embodiment of the present invention, a process for live sharing of plans and photos as a live file markup service with a shared knowledge hypergraph service is described herein.

Figure 1A:
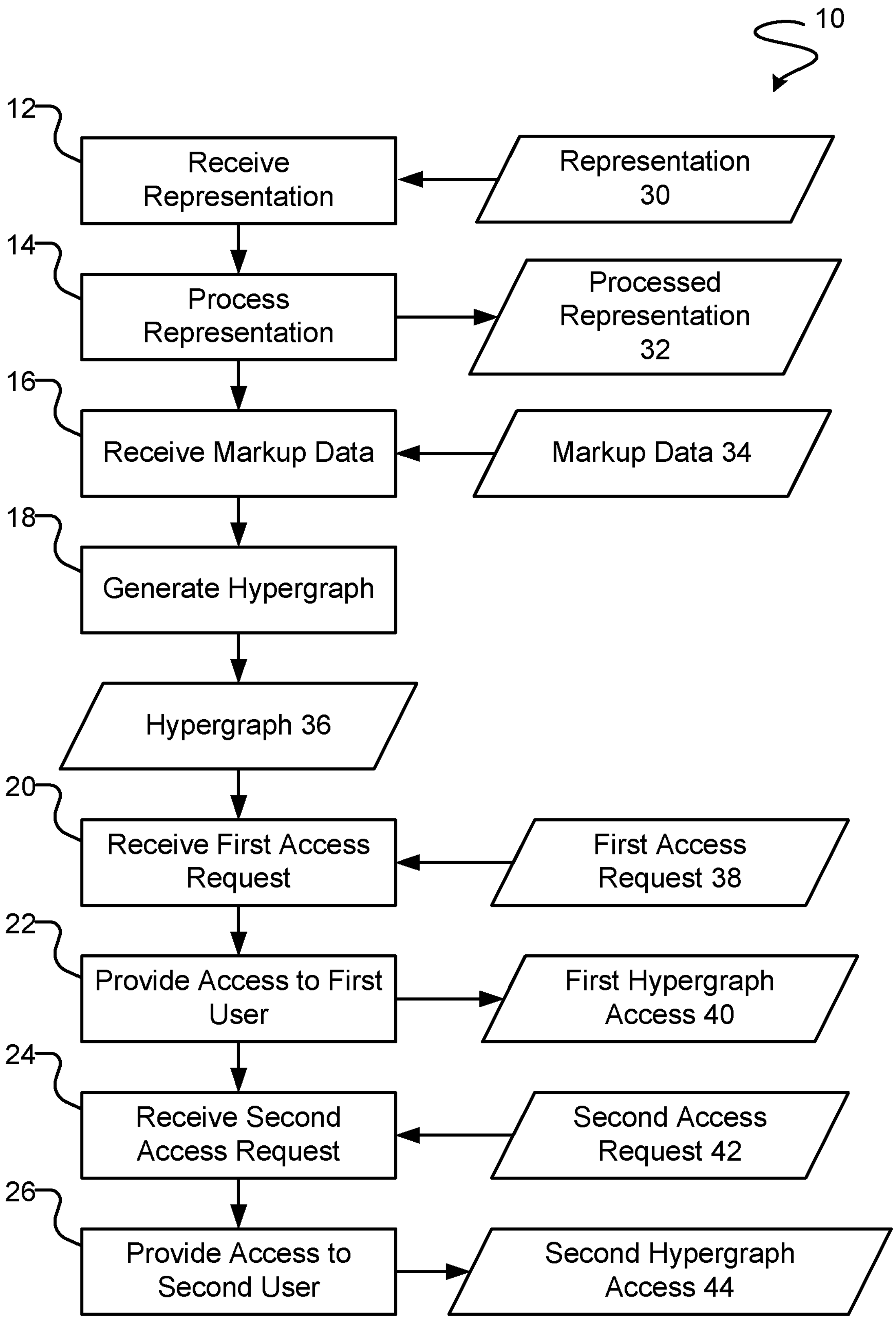
FIG. 1A is a schematic diagram of a method for providing concurrent multi-user access to a building representation markup hypergraph according to an example embodiment of the present invention.

FIG. 1A is a schematic diagram of method 100 for providing concurrent multi-user access to a building representation markup hypergraph according to an example embodiment of the present invention.

Method 10 comprises:

- step 12, receive building representation 30;
- step 14, generate processed building representation 32 from building representation 30;
- step 16, receive building representation markup data 34;
- step 18, generate hypergraph 36 based at least in part on generate processed building representation 32 and representation markup data 34, wherein hypergraph 36 comprises a graph triple-store database;
- step 20, receiving first access request 38 from a first user;
- step 22, in response to receiving first access request 38, providing first hypergraph access 40 to the first user;
- step 24, receiving second access request 42 from a second user; and
- step 26, in response to receiving second access request 42, providing second hypergraph access 44 to the second user concurrent with providing first hypergraph access 40 to the first user.

Figure 10:
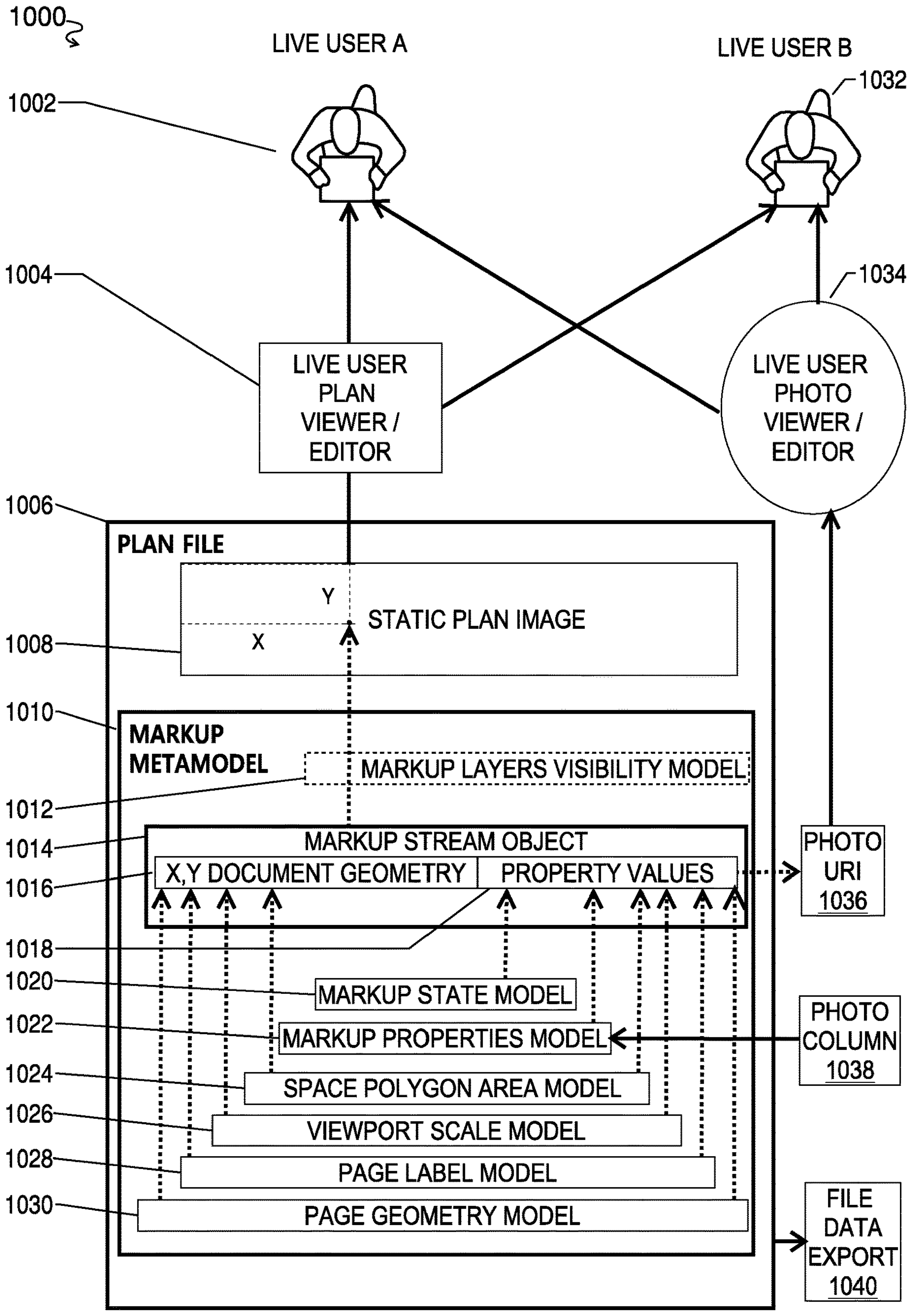
FIG. 10 is a plan metadata relationship diagram, according to an example embodiment of the present invention.
Figure 11A:
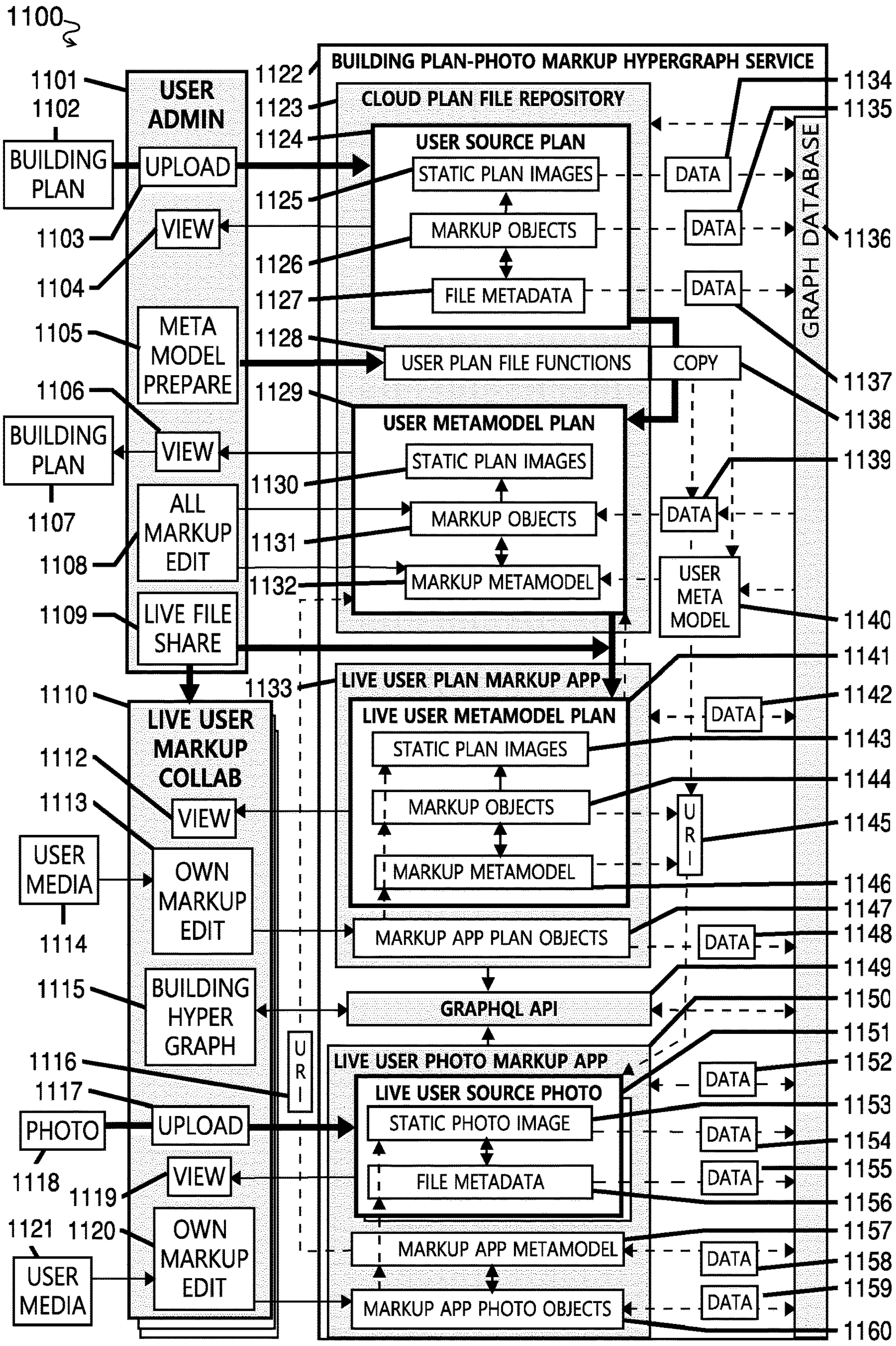
FIG. 11A is a process diagram of a live operational service, according to an example embodiment of the present invention.
Figure 12:
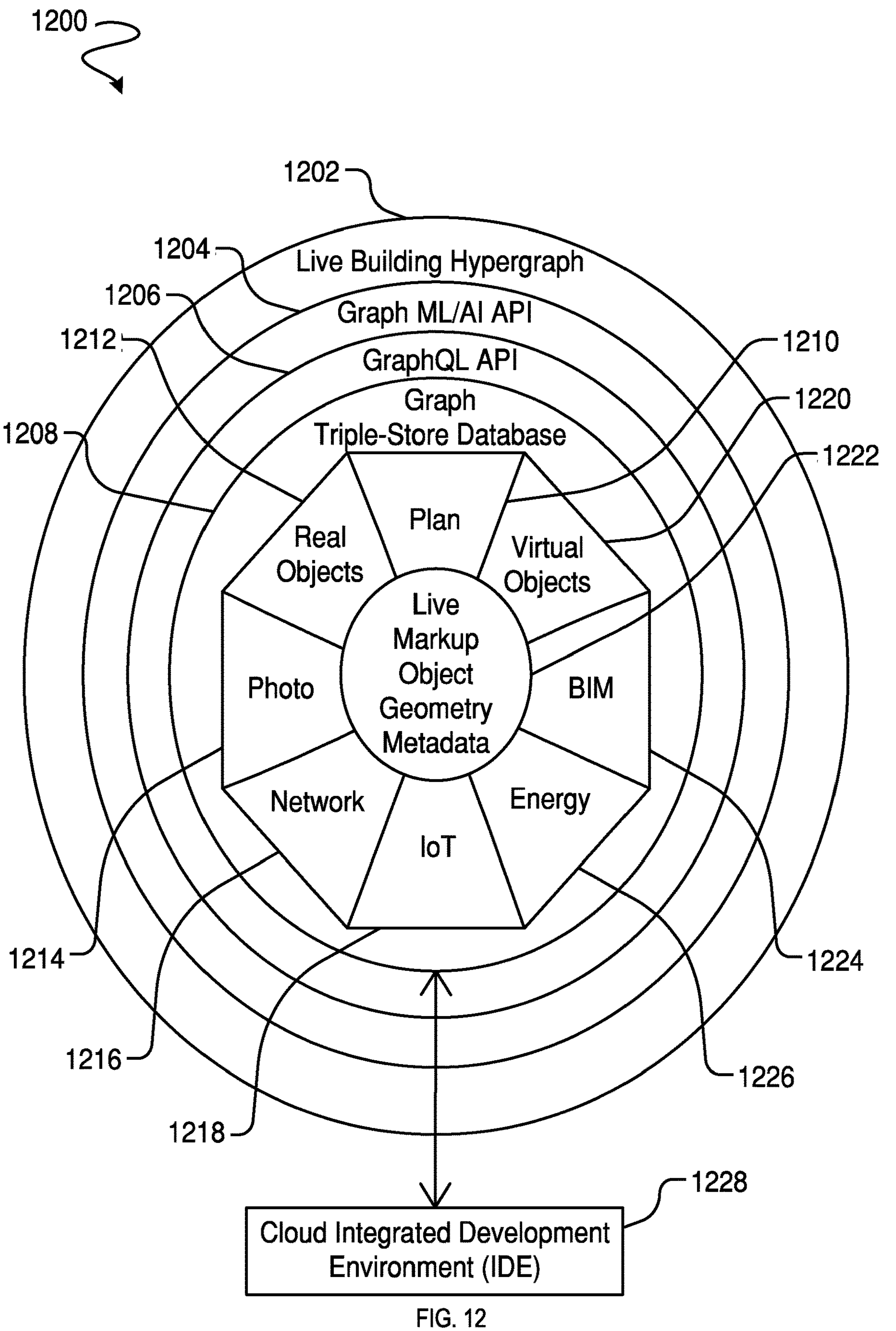
FIG. 12 is a hypergraph software cloud integrated development environment (IDE) model diagram, according to an example embodiment of the present invention.

To illustrate an example embodiment of the present the invention, the following building examples have been drawn and will be described:

a. New building perspective (FIG. 1B) and live markups (FIG. 1C).
b. New building orthogonal (FIG. 2A) and live markups (FIG. 2B).
c. Shared site plan orthogonal (FIG. 3A) and live markups (FIG. 3B)
d. Existing building orthogonal (FIG. 4A) and live markups (FIG. 4B).
e. Existing building spherical photos (FIGS. 5A, 6A, 7A, 8A) and live markups (FIGS. 5B, 6B, 7B, 8B).
f. Existing building spherical photo files live markup (FIGS. 5B, 6B, 7B, 8B) summary data table (FIG. 9).
g. A plan metadata relationship diagram (FIG. 10).

h. A process diagram of a live operational service (FIGS. 11A, 11B).

i. A hypergraph software cloud IDE model diagram (FIG. 12).

Figure 1B:
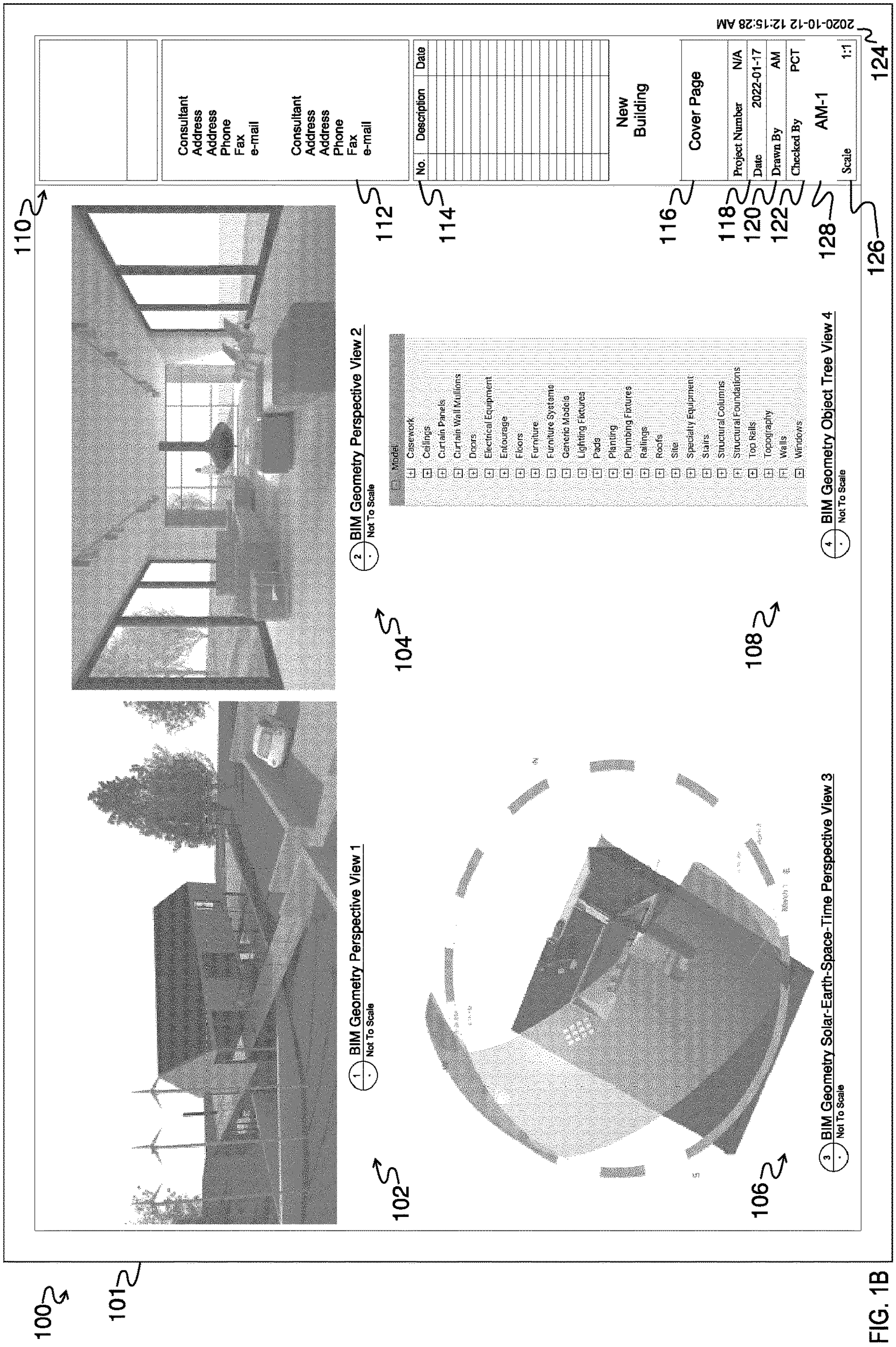
FIG. 1B is an example of a New Building Cover Page.

Referring to FIG. 1B:

a. 100—FIG. 1B viewport b. 101—New Building Cover Page—printed from a source CAD/BIM file c. 102—BIM geometry perspective image view 1 d. 104—BIM geometry perspective image view 2 e. 106—BIM geometry perspective image view 3 f. 108—BIM geometry object table image view 4 g. 110—Title block h. 112—Title block—consultant information i. 114—Title block—issue record j. 116—Title block—title k. 118—Title block—date l. 120—Title block—author m. 122—Title block—checker n. 124—Title block—CAD/BIM print date and time o. 126—Title block—scale ratio p. 128—Title block—drawing reference code FIG. 1B shows 100 a new building cover page plan 101 contained within a building plan file 1006 (see FIG. 10) as a static plan image 1008 viewed by means of a live user plan file viewer/editor application 1004 where no markup stream objects 1014 are visible 1012 to live users 1002, 1032.

One or more of the following title block 110 fields may be shown on one or more building plan deliverables: consultant information 112, issue record 114, title 116, date 118, author 120, checker 122, CAD/BIM print date and time 124, scale ratio 126, drawing reference code 128 which are typical on building construction drawings.

This sheet 101 is an example of a cover page sheet within the building construction industry.

This sheet 101 may be an example of a typical building plan file 1102 as an input to the service shown on FIG. 11A.

Figure 1C:
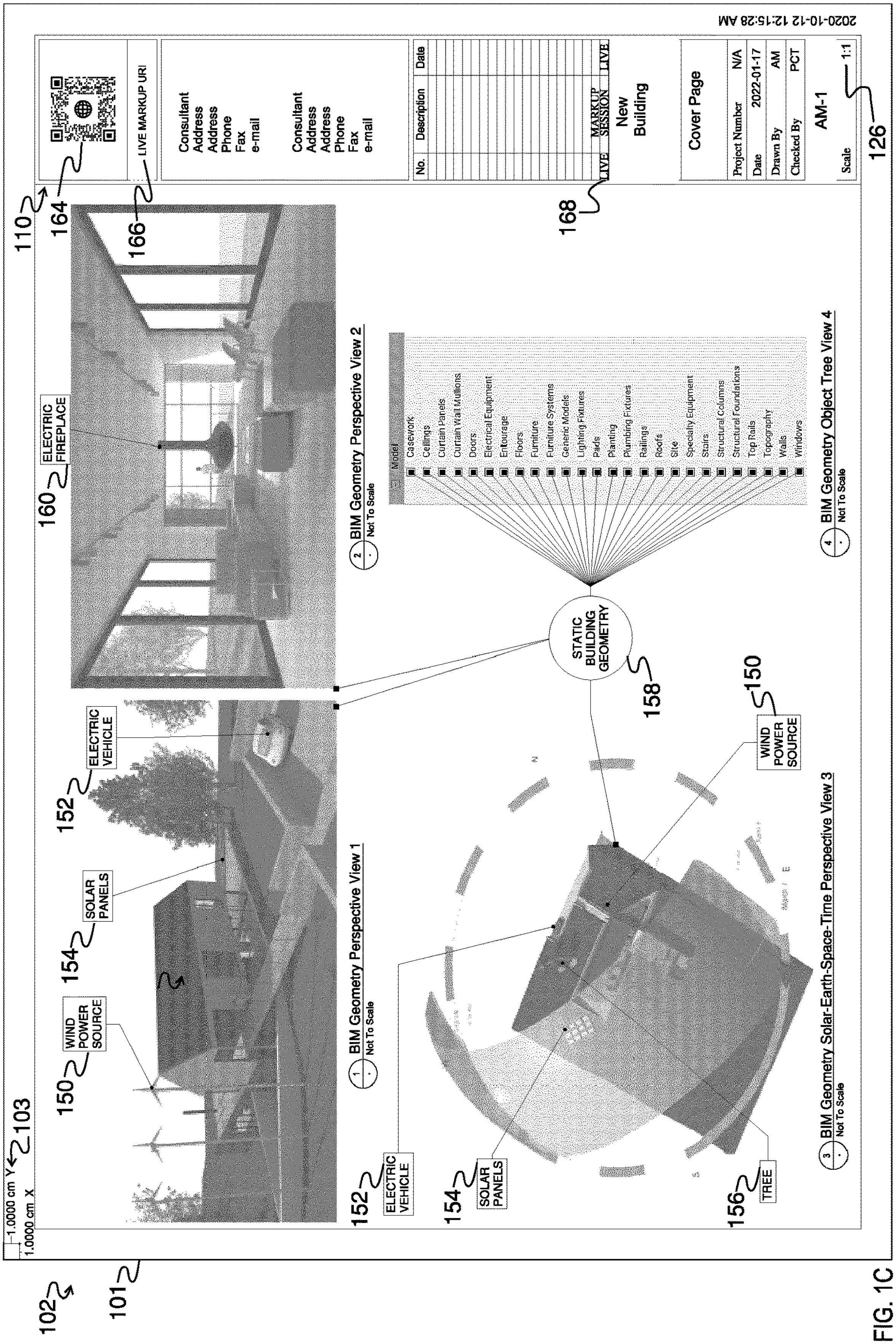
FIG. 1C is an example of the New Building Cover Page depicted in FIG. 1B with markup objects, according to an example embodiment of the present invention.

Having now provided an overview of FIG. 1B, FIG. 1C will now be described in more detail. Referring to FIG. 1C:

a. 101—New Building Title Page—printed from the source CAD/BIM file b. 102—FIG. 1C viewport c. 103—Markup object—Document measurements X, Y d. 110—Title block e. 150—Markup stream object—Wind power source callout f. 152—Markup stream object—Electric vehicle callout g. 154—Markup stream object—Solar panels callout h. 156—Markup stream object—Tree callout i. 158—Markup stream object—Static building object geometry j. 160—Markup stream object—Electric fireplace k. 164—Markup stream object—QR Code URI l. 166—Markup stream object—Title block text URI m. 168—Markup stream object—Title block—Live markup record FIG. 1C shows 102 the same sheet 101 as FIG. 1B with markup stream objects 1014 (see FIG. 10) now visible. The markup objects 1014 (See FIG. 10) as a geometric overlay on the static sheet image 1008. Markup stream objects 1014 are a variable visibility 1012 overlay that does not alter the static sheet image 1008 within the building plan file 1006.

Example markup stream objects 150-168 may be visible to live users 1002, 1032 (See FIG. 10) on perspective (non-orthogonal) viewports 102, 104, 106 and the CAD/BIM object table 108.

Note that within FIG. 1C multiple markup stream object examples may represent the same static BIM (virtual) object within multiple viewports, examples include: wind power source 150, electric vehicle 152, solar panels 154 and tree 156 callouts which may be shown in one or more than perspective viewports 102, 104, 106.

In this example, title block area 110 has markup text 166 added to symbolize a what-you-see-is-what-you-get (WYSIWYG) markup viewing and editing collaborative experience between multiple live users 1002, 1032 (see FIG. 10).

Note that the title block 110 is identical between the original (see FIG. 1B) drawing and the markup (FIG. 1C) examples and the plan page dimensions 1028 are also identical.

This enables markup object 1014 visual overlay with what-you-see-is-what-you-get (WYSIWYG) geometric fidelity with construction building plans.

The relationships between cover page image 101 and markup stream objects 1014 may be geometrically inferred by a live user 1002, 1032.

Plan file markup metadata 1010 may be exported from the plan file 1006 into one or more structured data file formats 1040 such as CSV, XML and/or JSON as a live service.

FIG. 1C is an example of a building plan file 1107 output from service 1100 shown on FIG. 11A.

Figure 2A:
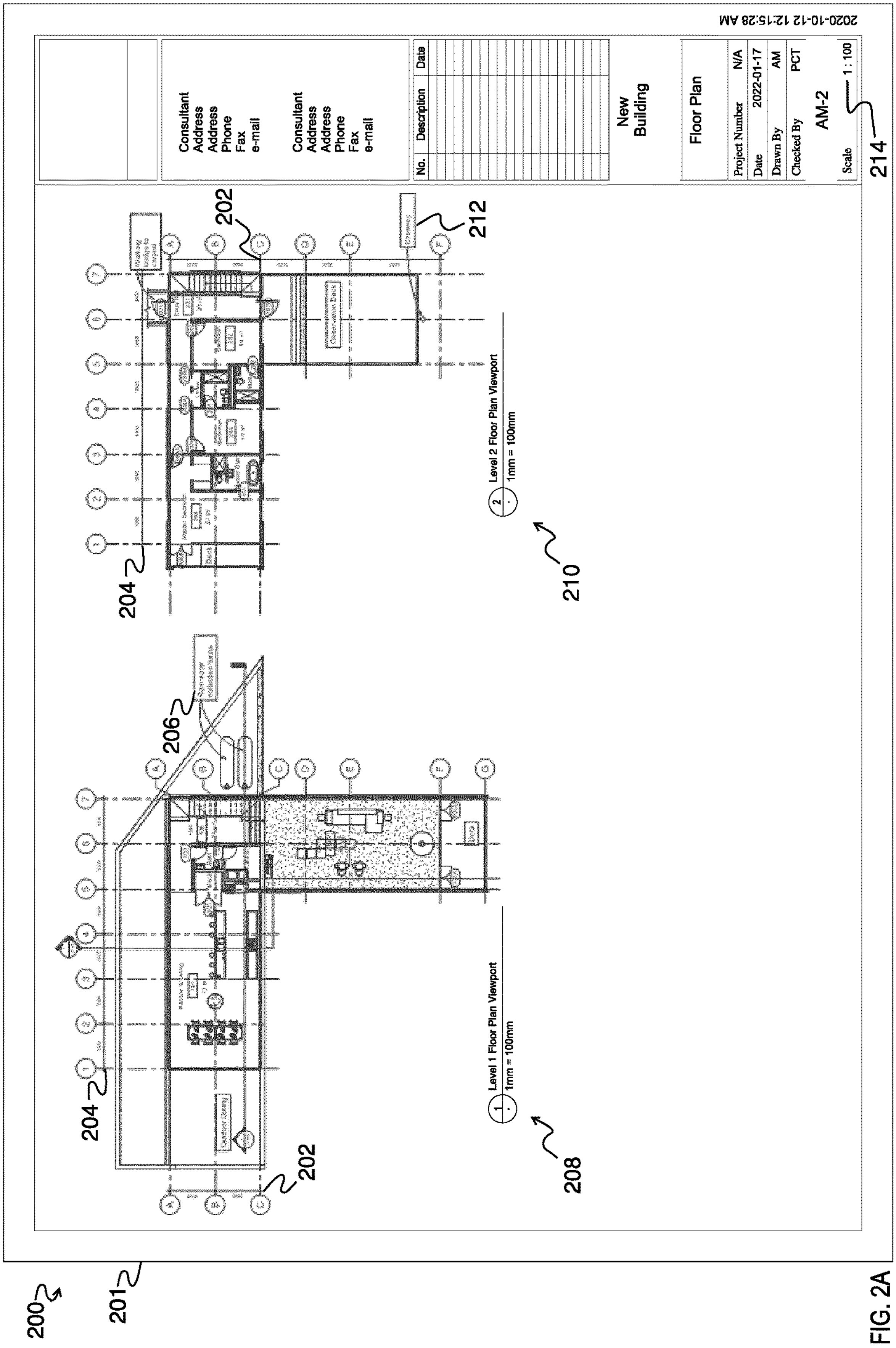
FIG. 2A is an example of a New Building Floor Plan.

Having now provided an overview of FIG. 1C, FIG. 2A will now be described in more detail. Referring to FIG. 2A:

a. 200—FIG. 2A viewport b. 201—New Building Floor Plan—printed from the source CAD/BIM file c. 202—Orthogonal construction vertical grid scale references d. 204—Orthogonal construction horizontal grid scale references e. 206—Architectural annotation CAD/BIM f. 208—Level 1 orthogonal plan view @1 mm=100 mm view scale g. 210—Level 2 orthogonal plan view @1 mm=100 mm view scale h. 212—Architectural callout annotation example i. 214—Title block drawing general scale FIG. 2A shows 200 a new building floor plan 201 contained within the building plan file 1006 (see FIG. 10) as a static plan image 1008 viewed by means of a live user plan file viewer/editor application.

The new floor plan 200 contains two viewports for building levels 1 208 and 2 210 both of which are orthogonal (not perspective) with a view scale of 1 mm=100 mm. A 1:100 view scale 214 means that a 1 millimeter measured within the viewport is equal to 100 millimeters in real-world building construction dimensions.

Both level 1 208 and level 2 210 viewports contain architectural and structural grid lines with horizontal (X) 204 and vertical 202 (Y) dimensions that are aligned between floors. Structural gridlines are common within building construction documents and provide an accurate geometric calibration reference which can be used to verify the accuracy of the view scale 214 ratio of each viewport 208, 210.

Building CAD/BIM architects and engineers often add text annotations 206, 212 within viewports 208, 210 to provide additional visual information on construction drawings. When printed this annotation text may exist as raster pixels within the static plan image 1008. As such, modification of annotation text 206, 214 typically requires reprinting the entire new building floor plan 201 from the source CAD/BIM file model, if available.

The new building floor plan 201 has a general view scale 214 of 1:100 which corresponds to the view scales in the level 1 208 and level 2 210 viewports. This view scale text 214 is also just a static sheet image in this example.

In some embodiments, one or more of plan file 1006 may not contain markup metadata 1010 for the sheet 201.

This FIG. 2A is an example of a building plan file 1107 as an input to service 1100 shown on FIG. 11A.

Having now provided an overview of FIG. 2A, FIG. 2B will now be described in more detail. Referring to FIG. 2B:

n. 201—New Building Floor Plan—printed from the source CAD/BIM file
o. 202—FIG. 2B Viewport
p. 250—Markup stream object—Food object
q. 252—Markup stream object—IoT object
r. 254—Markup stream object—Photo point
s. 256—Markup stream object—Tree bottom
t. 258—Markup stream object—Electric fireplace
u. 260—Markup stream object—Visible markup object properties table
v. 262—Markup stream object—Grid A1 reference point
w. 264—Markup stream object—Mechanical object
x. 266—Markup stream object—Electrical object
y. 268—Markup stream object—Computer object
z. 270—Markup stream object—Bed object
aa. 272—Markup stream object—Network object
bb. 274—Markup stream object—Bath object
cc. 276—Markup stream object—Portal object
dd. 278—Markup stream object—QR Code URI
ee. 280—Markup stream object—URI text
ff. 282—Markup stream object—Tree top
gg. 284—Markup stream object—Chair
hh. 286—Markup stream object—Chimney pen markup FIG. 2B shows 202 the same new floor plan 201 with markup stream objects 1014 (see FIG. 10) now visible as an overlay on the static sheet image 1008 by means of a live user plan viewer/editor 1004.

Example markup stream objects 250-286 may be visible to live users 1002, 1032 (see FIG. 10) on perspective (non-orthogonal) viewports 208, 210.

Note that within FIG. 2B multiple markups may represent the same object across multiple viewports 208, 210 including: tree 256, 282 and fireplace 258 with chimney 286.

Within this cover plan 201 has geometry a scale ratio of 1:100 214. This viewport scale ratio 214 may be stored as values 1018 within the markup metamodel 1010 (see FIG. 10) of the plan file 1006.

User markup stream objects 1014 placed sheet 201 will maintain their X, Y 103 geometry values 1016 and may benefit from viewport scale model 1026 calculations as a dynamic markup object property value 1018.

Visible markups stream objects 1014 shown 202 on the new building floor plan 201 include: food 250, Internet-of-Things (IoT) 252, photo point 254, tree bottom 256, electric fireplace 258, markup object metadata table 260, grid A1 reference point 262, mechanical object 264, electrical object 266, computer object 268, bed object 270, network object 272, bath object 274, portal object 276, QR Code URI 278, URI text 280, tree top 282 chair 284, chimney 286 each of which contain a unique object X,Y geometry 103 and shared markup object metadata table 260 properties.

Markup stream objects 1014 (See FIG. 10) may also include room geometry area polygons 1024 within their metadata.

Example markup objects 278, 280 are shown within the title block area of the plan floor plan markup sheet 201. A markup object 1014 (See FIG. 10) may provide a shared container for both visual geometry values 1016 and object data values 1018. As an example of this combination of visual geometry and metadata, the markup object for the QR code 278 may contain the same URI text as a machine-readable image geometry value 1014 and an object value 1018 as a URI text string within its markup properties model 1022.

By loading a photo URI 1036 within the photo column 1038 of the markup properties model 1022 any markup objects 1014 within the plan file 1006 may store a unique photo URI 1030 hyperlink text as an object value 1016 relationship.

Note that the electric fireplace markup object 258 shown in FIG. 2B was previously shown 160 within FIG. 1C. Effectively these two markups are visual pointers to the same BIM object 1224 (see FIG. 12). In this example live markup stream objects 1222 may be used to visually link multiple data relationships to the same virtual object 1220.

Note the example markup object table 260 contains rows of custom markup properties including columns for PDF 1210, Photo 1214, IoT 1218, Network 1216, Power 1226, Scope, Corporation, Carbon, Lifecycle and Custom property values.

This may enable any live markup stream object 1014 to act as a shared geometry reference object key 1222 (see FIG. 12).

The relationships between markup objects and their external metadata sources may be linked through URI property values while not storing the data within the plan file itself.

The relationships between new building 201 markup stream objects 1014 may be individually inferred by a live user 1002, 1032 (see FIG. 10) through a plan viewer/editor application 1004.

One or more of file static plan images 1008, markup metadata 1010, markup stream objects 1014 and their document geometry 1016 and property 1018 values may be exported from the plan file 1006 into one or more structured data file formats 1040, for example one or more of: CSV, XML and JSON.

FIG. 2B is an example of a building plan file 1107 as an output of service 1100 shown on FIG. 11A.

Figure 3A:
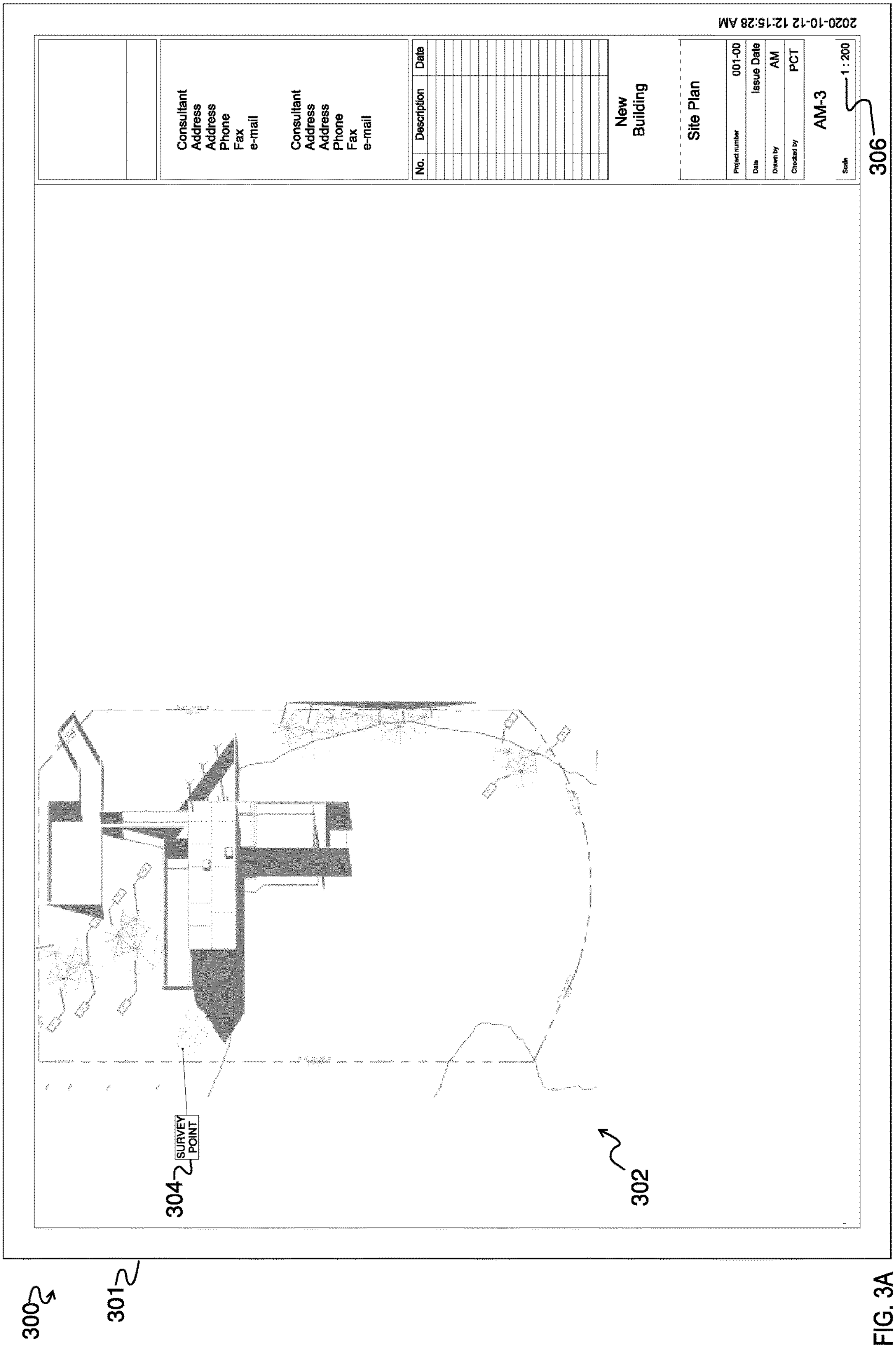
FIG. 3A is an example of a Site Building Plan.

Having now provided an overview of FIG. 2B, FIG. 3A will now be described in more detail. Referring to FIG. 3A:

a. 300—FIG. 3A Viewport
b. 301—New Building Floor Plan—printed from the source CAD/BIM file
c. 302—BIM Orthogonal Site Plan Viewport
d. 304—BIM Site survey unique point
e. 306—Title block—1:200 view scale FIG. 3A shows 300 a new building site plan 301 contained within the building plan file 1006 (see FIG. 10) as a static plan image 1008 viewed by means of a live user plan file viewer/editor application 1004 where no markup stream objects 1014 are visible 1012 to live users 1002, 1032.

The example site plan drawing 301 contains one CAD/BIM image viewport 304 which is orthogonal (not perspective) with a title block view scale 306 of 1:200. This means that 1 unit measured within the viewport equals 200 units in real-world building construction measurements.

This CAD/BIM generated site plan viewport 304 contains a unique mapped site survey point 304 corresponding to real world position such as geographic information system (GIS) coordinates.

This site plan 301 is an example of a typical construction document for each building in a static form.

This FIG. 3A may be an example of a building plan file 1107 as an input to service 1100 shown on FIG. 11A.

Having now provided an overview of FIG. 3A, FIG. 3B will now be described in more detail. Referring to FIG. 3B:

a. 301—Site Plan—printed from the source CAD/BIM file
b. 305—FIG. 3B Viewport
c. 352—Markup stream object—Point A1
d. 354—Markup stream object—geoJSON point
e. 356—Markup stream object—Solar array
f. 360—Markup stream object—Tree
g. 362—Markup stream object—Circle Area imperial measurement
h. 364—Markup stream object—Circle area metric measurement
i. 366—Markup stream object—Visible markup object properties table
j. 368—Markup stream object—Wind power source
k. 369—Markup stream object—Rainwater collection
l. 370—Markup stream object—Satellite orthophoto viewport overlay
m. 372—Markup stream object—Public spherical photo point
n. 374—Markup stream object—Existing building point
o. 378—Markup stream object—Heat pump
p. 382—Markup stream object—Vehicle
q. 384—Markup stream object—Tree FIG. 3B shows 302 the same site plan 301 with markup stream objects 1014 (See FIG. 10) now visible as an overlay on the static sheet image 1008 by means of a live user plan viewer/editor 1004.

Within this site plan 301 a site aerial orthophoto 370 overlayed on the original viewport 302 to create a combined visual plan image 305 which includes BIM 1224 (See FIG. 12), virtual 1220 objects and satellite photo 1214 of real world site objects 1212.

An orthophoto image 370 is a geometrically corrected aerial photograph that displays ground features in their true ground position with a constant scale throughout the image.

This site plan 301 has a geometric scale ratio of 1:200 306. This viewport scale ratio may be stored within the markup metamodel 1010 of the plan file 1004.

Example visible markup geometry objects are shown 305 on the combined viewports 302, 370 including: A1 Point 352 which may be geometrical related to the A1 Point 262 shown in FIG. 2B, geoJSON Point 354 which may be geometrically related to the site survey unique point 304, solar array 356, tree 360 which may be geometrically related to the markups 256, 282 shown in FIG. 2B, circle area imperial 362 and metric 364 measurements, wind power source 368 which may be geometrically related to the markup 150 shown in FIG. 1C, rainwater collection 369 which may be geometrically related to the rain water collection image 206 shown in FIG. 2A, public spherical photo point 372 with a photo URI property value pointing to a cloud hosted spherical photo 1214, existing building alignment point 374, heat pump 378, vehicle 382 and tree image 384. Each markup object 1014 (see FIG. 10) may contain a unique document X,Y geometry 1016 and share markup properties values 1018 as represented within the markup object metadata table 366.

Example markup object table 366 contains rows of select markup stream objects 1014 with a custom markup properties model 1022 which includes columns for PDF 1210, Photo 1214, IoT 1218, Network 1216, Power 1226, Floor, Scope, Corporation, Carbon, Lifecycle and Custom user selected property values.

This may enable a live markup stream object 1014 to act as a shared geometry reference object key 1222 (see FIG. 12) for multiple data relationships.

The relationships between site plan 301 markup objects and their external metadata sources can be linked through URI properties values while not storing the external data within the plan file itself.

Note that a new building reference point 352 may be geometrically linked to an existing building reference point 374 through a geometric relationship between their geometries within a site plan 301.

Orthographic site plan viewports can be combined from plan, image and/or photo sources into the same site plan 301 while enabling user markup objects 1012 with unique document geometries 1014 and property values 1016.

The relationship between site plan 301 markup stream objects 1014 may be individually inferred by a live user 1002, 1032 through a plan viewer/editor application 1004.

Plan file markup metadata 1010 may be exported from the plan file 1006 into one or more structured data file formats 1040, for example one or more of: CSV, XML and JSON.

FIG. 3B is an example of a building plan file 1107 as an output of service 1100 shown on FIG. 11A.

Figure 4A:
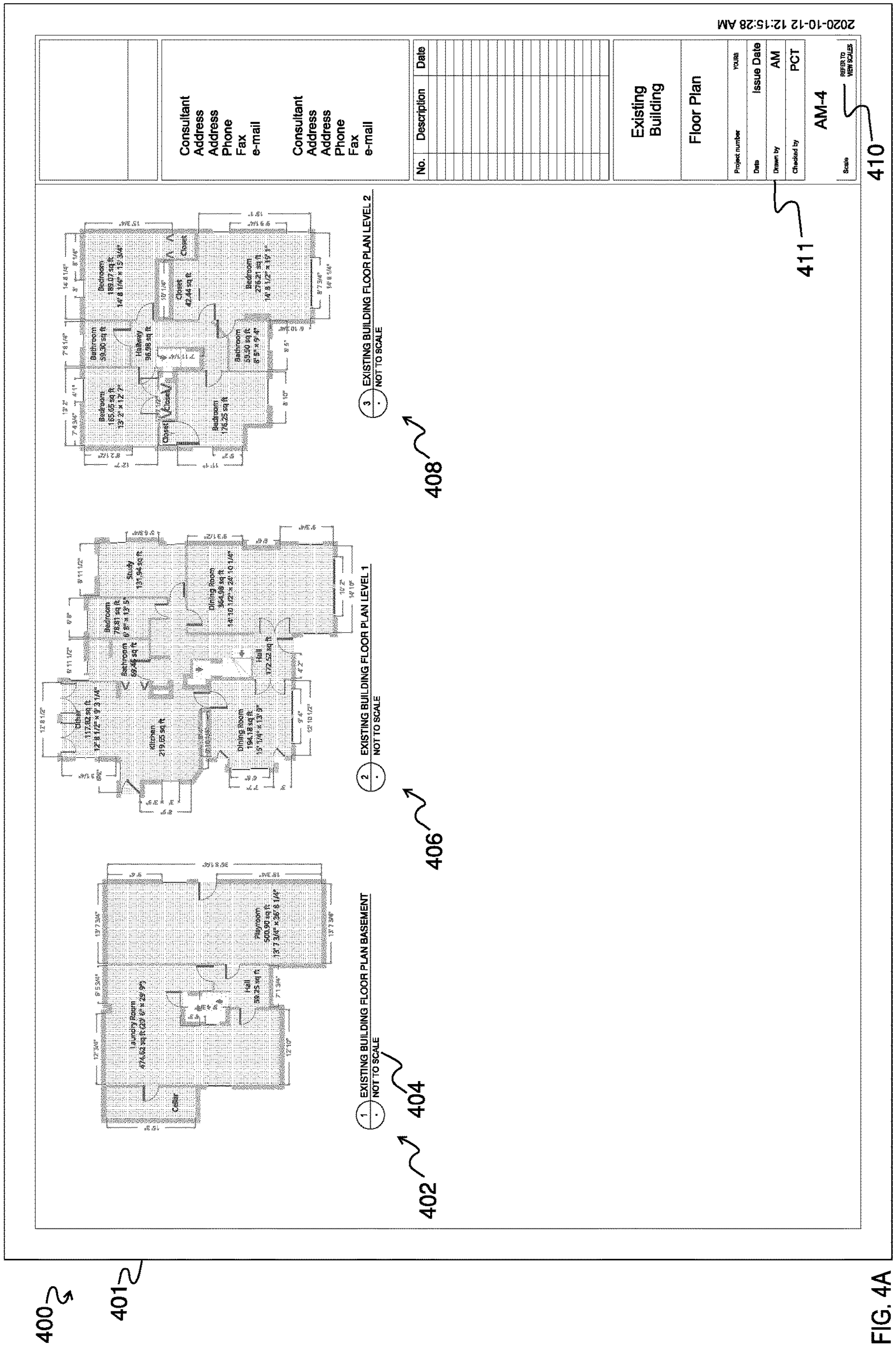
FIG. 4A is an example of an Existing Building Floor Plan.

Having now provided an overview of FIG. 3B, FIG. 4A will now be described in more detail. Referring to FIG. 4A:

a. 400—FIG. 4A Viewport
b. 401—Existing Building Floor Plan
c. 402—Existing floor plan basement viewport
d. 404—Viewport "Not To Scale"
e. 406—Existing floor plan level 1 viewport
f. 408—Existing floor plan level 2 viewport FIG. 4A shows 400 an existing building floor plan 401 contained within the building plan file 1006 (see FIG. 10) as a static plan image 1008 viewed by means of a live user plan file viewer/editor application 1004 where no markup stream objects 1014 are visible 1012 to live users 1002, 1032.

The existing floor plan 401 contains three CAD/BIM image viewports 402, 406, 408 which are orthogonal (not perspective) but with no view scales 410 drawn by the floor plan author 411.

The existing floor plan 401 may have not been printed from a CAD/BIM file.

This FIG. 4A may be an example of a building plan file 1107 as an input to service 1100 shown on FIG. 11A.

Having now provided an overview of FIG. 4A, FIG. 4B will now be described in more detail. Referring to FIG. 4B:

a. 401—Existing Building Floor Plan
b. 403—FIG. 4B Viewport
c. 452—Markup stream object—Text box
d. 454—Markup stream object—Electrical panel
e. 456—Markup stream object—Refrigerator
f. 458—Markup stream object—Heat pump
g. 460—Markup stream object—Photo point 1
h. 462—Markup stream object—Dryer Machine
i. 464—Markup stream object—Washer Machine
j. 466—Markup stream object—Hot water tank
k. 468—Markup stream object—Calibrated view scale markup
l. 472—Markup stream object—Visible markup object properties table
m. 480—Markup stream object—Photo point 2
n. 482—Markup stream object—Light Example
o. 484—Markup stream object—Library Fireplace
p. 486—Markup stream object—Living Room Fireplace
q. 488—Markup stream object—Photo point 3
r. 490—Markup stream object—Bedroom Fireplace
s. 494—Markup stream object—Photo location 4

FIG. 4B shows 403 the same existing floor plan 401 with markup stream objects 1014 (See FIG. 10) now visible as a geometric overlay.

A scale model 1024 (see FIG. 10) may be saved within the plan metadata 1008 of the plan building file 1004 with a custom view scale ratio 410. The view scale ratio may be shown as a view scale markup 468 on each of the three viewports 402, 406, 408.

Example visible markup objects shown 403 include: text overlays 452, electrical panel 454, refrigerator 456, heat pump 458, photo point 1 460, dryer 462, washer 464, hot water tank 466, calibrated view scale markup 468, visible markup object properties table 472, photo point 2 480, light example 482, library fireplace 484, living room fireplace 486, photo point 3 488, bedroom fireplace 490, photo location 4 494 each of which may contain a unique object X,Y geometry 103 and shared markup object metadata 472.

Note the example markup object table 472 contains metadata columns for PDF 1210, photo 1214, IoT 1218, network 1216, power 1226, scope, corporation, carbon and custom user selected property values 1018.

Note the user markup objects within the table 472 may each contain markup metadata 1222 (See FIG. 12) that may create relationships within a graph database 1208 between plan 1210, real 1212, virtual 1220, photo 1214, BIM 1224, network 1216, energy 1226 and IoT objects 1218.

The relationships between markup objects and external data sources can be uniquely linked through URI properties values while not storing the external data within the plan file 1006 itself.

Note that both new and existing building reference points may be geometrically linked to new building reference points within a geometrically accurate site plan 301.

This example is intended to demonstrate that both existing and new building viewports and markups can be combined from any plan, image and/or photo source into a graph relationship database model 1208.

This may enable a live markup stream object 1014 to act as a shared geometry reference object key 1222 (see FIG. 12) within a graph database 1208.

In one embodiment, building geometry metadata relationships 1222 (see FIG. 12) can be modelled within the graph database 1208 while not storing the external data within the database itself.

Note that photo point markups 460, 480, 488, 494 may contain a URI hyperlink reference to a linked photos as shown in FIGS. 5A, 6A, 7A, and 8A.

The relationship between existing building 401 markup stream objects 1014 may be individually inferred by a live user 1002, 1032 through a plan viewer/editor application 1004 as a static plan image 1008.

One or more of plan file markup metadata 1010 may be exported from the plan file 1006 into one or more structured data file formats 1040, for example one or more of: CSV, XML and JSON.

FIG. 4B is an example of a building plan file 1107 as an output of service 1100 shown on FIG. 11A.

Figure 5A:
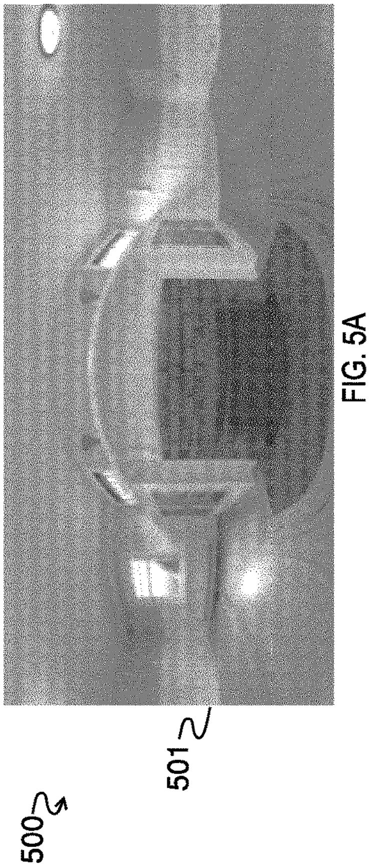
FIG. 5A is an example of a spherical photo file of a library space.
Figure 6A:
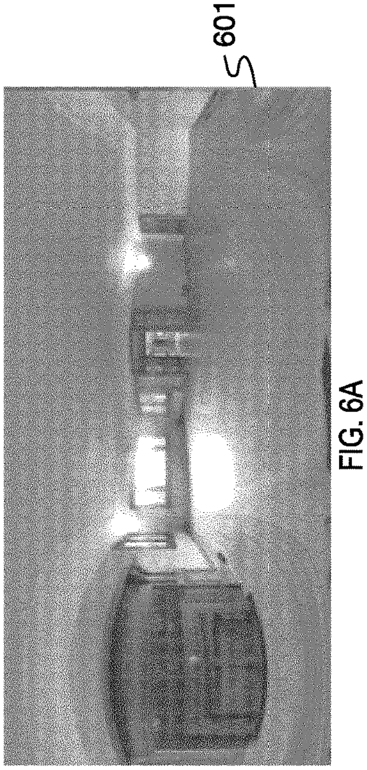
FIG. 6A is an example of a spherical photo file of a living room space.
Figure 7A:
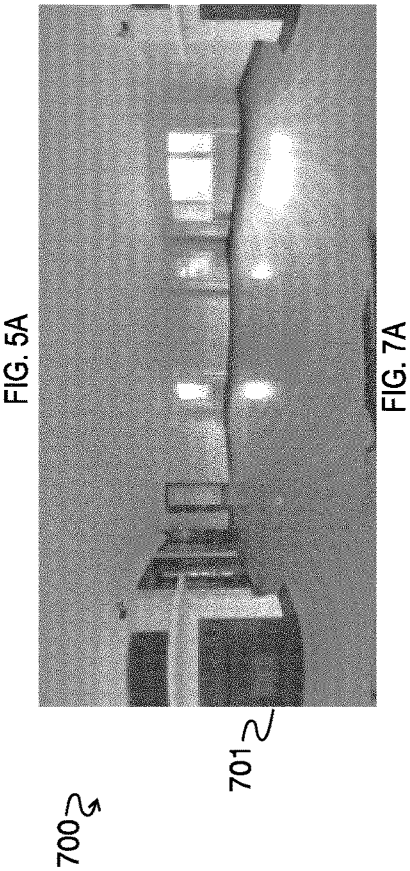
FIG. 7A is an example of a spherical photo file of a bedroom space.
Figure 8A:
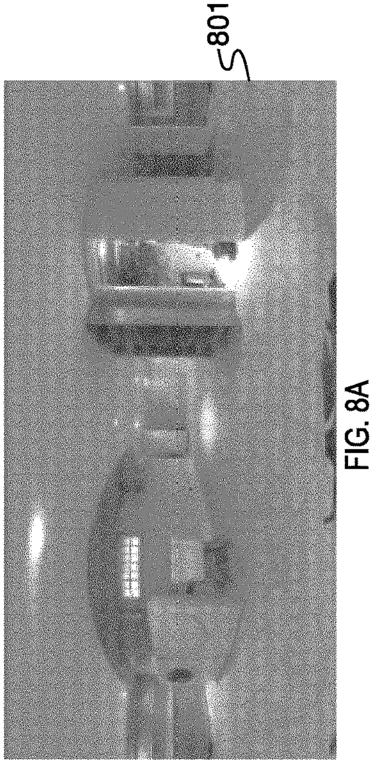
FIG. 8A is an example of a spherical photo file of an indoor space.

Having now provided an overview of FIG. 4B, FIGS. 5A, 6A, 7A and 8A will now be described in more detail. Referring to FIGS. 5A, 6A, 7A and 8A:

a. 500—FIG. 5A
b. 501—Library Photo
c. 600—FIG. 6A
d. 601—Living Room Photo
e. 700—FIG. 7A
f. 701—Bedroom Photo
g. 800—FIG. 8A
h. 801—Indoor Photo FIGS. 5A, 6A, 7A and 8A each show an example of a user building photo file 1118 (see FIG. 11A) uploaded 1117 to a live photo markup web application 1150 as a live shared user source photo 1151 for viewing 1119 by live collaborative users 1110 of a hypergraph service 1122.

FIGS. 5A, 6A, 7A and 8A each show an example of user building photo files 1118 (See FIG. 11A) viewed by live users 1002, 1032 (see FIG. 10) by means of a photo viewer/editor application 1034.

FIG. 5A shows 500 a user spherical photo of the library space 501 from the existing floor plan drawing 401 (SEE FIG. 4B) captured at photo point 2 480.

FIG. 6A shows 600 a user spherical photo of the living room space 601 from the existing floor plan drawing 401 (SEE FIG. 4B) captured at photo point 3 488.

FIG. 7A shows 700 a user spherical photo of the bedroom space 701 from the existing floor plan drawing 401 (SEE FIG. 4B) captured at photo location 4 494.

FIG. 8A shows 800 a user spherical photo of the indoor space 801 from the existing floor plan drawing 401 (See FIG. 4B) captured at photo point 1 460.

These photo files 501, 601, 701, 801 are spherical format images but non-spherical images can also be used as user building photo file 1118. The uploaded files 1117 may also be video format files which can be split into individual frames by the live photo markup app 1150.

The live photo markup application 1150 may generate a unique URI 1116 for each live user source photo 1151 and spherical view 1119 which can be stored in the graph database 1136 as relationships.

One or more of photo file 1151 and metadata 1153, 1156 may be exported into one or more structured image 1154 and/or tabular data file formats 1155 for example one or more of: CSV, XML and JSON.

Having now provided an overview of FIGS. 5A, 6A, 7A and 8A, FIGS. 5B, 6B, 7B and 8B will now be described in more detail. In FIGS. 5B, 6B, 7B and 8B:

a. 500—FIG. 5B
b. 501—Library Space Photo
c. 503—Photo file metadata view
d. 504—Spherical camera point A
e. 506—Markup stream object—Library Fireplace
f. 508—Markup stream object—Light Object
g. 600—FIG. 6B
h. 601—Living Room Space Photo
i. 604—Markup stream object—Living Room Fireplace
j. 606—Markup object—Spherical Camera Point B
k. 603—Photo file metadata view
l. 700—FIG. 7B
m. 701—Bedroom Space Photo
n. 703—Photo file metadata view
o. 704—Markup stream object—Spherical Camera Point C
p. 706—Markup stream object—Bedroom Fireplace
q. 708—Site Plan Hyperlink
r. 800—FIG. 8B
s. 801—Indoor Space Photo
t. 802—Markup stream object—Washer
u. 803—Photo file metadata view
v. 804—Markup stream object—Dryer
w. 808—Markup stream object—Refrigerator
x. 810—Markup stream object—Electrical Panel
y. 812—Markup stream object—Gas Furnace
z. 814—Markup stream object—Hot water Tank
aa. 816—Markup stream object—Spherical Camera Point D FIGS. 5B, 6B, 7B and 8B each show an example of the same spherical photos 501, 601, 701 and 801 stored as user source photos 1151 on the live photo markup application service 1150 viewed through a photo viewer/editor view 1119 with live photo markup objects 1160 now visible within the live photo markup web application app metamodel 1157.

The live photo markup web application 1150 may contain user photo markup objects 1160 as a visual meta model application overlay 1157 on the photo static plan image 1153.

In one or more embodiments of the present invention, the relationships between the app markup metadata model 1157 and the plan file metadata 1140 may be created and stored within the graph database 1136.

In one or more embodiments of the present invention, user building photos 1118 that are spherical 500, 600, 700, 800 are automatically converted to a spherical viewer 1119 mode based on the photo file metadata file properties 1156 read by the live photo markup application 1150.

In one or more embodiments of the present invention, each spherical photo image 501, 601, 701, 801 can be set with a camera height (z) position 504, 606, 704, 816. A spherical photo 1151 with a stored height (z) 504 can be used to enable 3-dimensional (3D) markup measurements 818 within the live photo markup app 1150.

In one or more embodiments of the present invention, the live photo markup application 1150 would enable live viewing of photo file metadata 1155, 1157, 1159 as a dynamic overlay 502, 610, 708, 818 within the live user photo viewer 1119.

Photo markup objects are visible in FIGS. 5B, 6B, 7B, 8B. Example photo markup objects include: spherical camera x, y, z measurement points 504, 606, 704, 816, fireplaces 506, 604, 706, site plan hyperlink 708, mechanical and electrical objects such as a washer 802, dryer 804, refrigerator 808, electrical panel 810, gas furnace 812, and hot water tank 814 and 3D measurement 818 example markup objects 1016 (see FIG. 1016)

Note that a photo 1214 markup object 1222 may be represented as a real world object geometry 504, 608, 704, 816 relationships within the graph database 1208.

Photo 1214 markup objects and plan 1210 markup objects may be linked through live markup geometry metadata 1222 relationships within the graph database 1208.

The photo file metadata 1156 may include the date and time in which the photo was uploaded 1117 which may be stored within the markup app metamodel 1157 within the graph database 1208.

Having now provided an overview of FIGS. 5B, 6B, 7B and 8B, FIG. 9 will now be described in more detail. Referring to FIG. 9:

900—FIG. 9 Viewport

902—Photo Markup Object Metamodel Summary Table

Markup object table 902 shows a visual summary of selected live photo markup objects within FIGS. 5B, 6B, 7B and 8B.

Note the example markup object table 900 contains columns which may store values to link relationships between real 1212 and virtual objects 1220 within the graph database 1208.

One or more of photo file 1151 and metadata 1156, 1157, 1160 may be exported into one or more structured image 1154 and/or tabular data file formats 1155, 1158, 1159, for example one or more of: CSV, XML and JSON.

Having now provided an overview of FIG. 9, FIG. 10 will now be described in more detail. Referring to FIG. 10:

a. 1000—FIG. 10 Viewport
b. 1002—Live user A
c. 1004—Live user plan filer viewer/editor software
d. 1006—Building plan file
e. 1008—Static plan image
f. 1010—File markup metadata
g. 1012—Markup layer variable visibility model
h. 1014—Markup stream object
i. 1016—Markup X, Y document values
j. 1018—Markup property values
k. 1020—Markup state model
l. 1022—Markup properties model
m. 1024—Space polygon area model
n. 1026—Markup viewport scale model
o. 1028—Page label model
p. 1030—Page geometry model
q. 1032—Live user B
r. 1034—Live user photo viewer/editor software
s. 1036—Photo URI
t. 1038—Photo custom property/column
u. 1040—Data export file FIG. 10 shows 1000 a block diagram how a single plan file 1006 may be viewed in terms of two or more simultaneous live users 1002, 1034.

This diagram shows a simplified version of two live users 1002, 1032 viewing the same plan file 1006 on a cloud plan file repository 1123 (See FIG. 11A). The plan file 1006 looks the same to each user and contains the same markup objects 1014 and markup metamodel 1010 within. The visibility of a markup stream object 1014 within the plan file 1004 is variable for each live user 1002, 1032 based on markup layer settings on their individual client plan viewer/editor 1004. This example does not show simultaneous markup editing as this shown in the process 1100 of the FIG. 11A.

All markup stream objects 1014 are visible to both users in this configuration as they are live sharing the same plan file 1006 and markup metamodel 1010. This provides live geometrical visual and data model alignment between multiple users.

A file markup metamodel 1010 can be customized within extensible markup shown 1000 as:

a. Markup state model 1020 may define user customized state properties that can be applied as time stamped events to markups.
b. Markup properties model 1022 that provide user shared columns to store property values 1018.
c. Sheet space area model 1024 to define spaces and room geometries that may be geometrically aligned within a plan image 1008.
d. Sheet view scale model 1026 to automatically calculate view scale measurements when markups are added by users.
e. Sheet page label model 1028 to create geometry relationships between plan image 1008 sheets within the plan file 1006.
f. Sheet page geometry model 1030 to define the length and width dimensions of static plan image 1008 sheets within the plan file 1006.

The plan file metamodels 1018, 1020, 1024, 1026, 1028, 1030 can be embedded within plan file 1006 and all live user markup stream objects 1014 may have access to shared metamodel properties 1010.

A plan metamodel 1010 configuration may be standardized for one or more plan files by a user administrator 1101 and applied operationally as shown on the process diagram 1100 in FIG. 11A.

Having now provided an overview of FIG. 10, FIG. 11A will now be described in more detail. Referring to FIG. 11A:

Refer to FIG. 11B for number descriptions.

The following describes a process 1100 for preparing a user supplied building plan file 1102 and a user supplied building photo file 1118, however this process 1100 may be operated as a continuous Live Building Plan-Photo Hypergraph Service 1122 which can be scaled dynamically to a greater quantity of user input files 1102, 1118 user administrators 1101, live user markup collaborators 1110 across any number of buildings as a cloud based file collaboration hypergraph service 1122.

The user cloud plan file repository 1123, live user plan markup application 1133, live user photo markup application 1150, the graph database 1136 with graphQL™ API 1149 service may be interconnected systems within a live building plan-photo markup hypergraph service 1122. These systems can be further configured and automated by means of a user admin 1101 service and/or cloud integrated development environment 1228 (see FIG. 12).

The user admin 1101 can prepare file metamodels 1105 within the service 1122 manually or with batch plan file function automations 1128.

A cloud file repository service 1123 provides secure file storage, source plan 1124, version and sharing control for a user administrator 1101 to operate the live building plan-photo hypergraph service 1122 on behalf of live user file markup collaborators 1110.

The user admin 1101 may begin the process 1100 by uploading 1103 a user building plan file 1102 to the cloud plan file repository 1123. The file repository 1123 may be a user-selected PDF application that enables markups in parallel using a live server service.

When uploaded the building plan file 1102 becomes a user source plan file 1124 cloud stored and source controlled on the plan file repository 1123. The user source file 1124 can have its static plan images 1125, markup objects 1126 and file metadata 1127 extracted, transferred and loaded to a building graph triple-store database 1136.

This extraction can be done manually by a user admin 101 operator by means of data export 1135, 1137 to CSV, XML or JSON file formats and/or uploaded by API script to the building graph database 1136.

The building graph database 1136 stores one or more file and file metadata objects 1134, 1135, 1137 and their relationships. The graph database service may include a GraphQL™ API 1149 as a hypergraph service that provides a live user hypergraph data API service 1115 for live user collaborators 1110.

The user admin 1101 may utilize the building hypergraph data API service 1115 to visualize one or more of files 1124, markup objects 1126, file metadata 1127 contained within the cloud file repository 1123 and live markup applications for plans 1133 and photos 1150 connected as relationships within the building graph database 1122.

The user admin 1101 may convert the user source plan file 1124 into a user metamodel plan file 1129 by means of manual or automated plan file functions 1128. The user admin may initiate a plan file function 1128 that copies 1138 the original source plan file 1124 and creates a new user metamodel plan file 1129 within the cloud file storage repository 1123.

The user admin 1101 may use a series of plan file functions 1128 to configure user 1105 metadata models 1020, 1022, 1024, 1026, 1028, 1030 contained within the user metamodel file 1129 prior to live sharing 1109 the file with live user markup collaborators 1110.

Once metamodels 1020, 1022, 1024, 1026, 1028, 1030 are configured 1108 by the user admin 1101, user admin 1101 markup objects 1131 may be added 1108 into the user metamodel plan file 1129. Optionally the user source metamodel markup objects 1131 may be automatically imported based on file markup data 1139 provided by the building graph database 1122.

The user metamodel plan file 1129 retains its static image 1130 with the user source plan 1124 static image 1125 but now has a markup metamodel 1132 and markup objects 1131 now loaded within the user metadata plan file 1229.

The user admin 1101 is able to edit one or more of plan markup objects 1131 and their metadata properties 1132 contained within the user metamodel plan file 1129 through a plan editor application 1108. When a user admin 1101 edits a static metamodel plan file 1129 and checks the file back into the cloud file repository 1123 the markups 1131 can be extracted from the file 1129 into the building graph database 1136 using data extraction processes 1134, 1135, 1137.

The user metamodel plan 1129 may be loaded with a user meta model 1140 that contains a metadata photo property URI value 1145 pointing to a photo file 1151 stored on the live photo markup application service 1150.

The user admin 1101 may initiate a plan session function which checks out the user metamodel plan 1129 from the cloud file repository 1123 and transfers the file editing permissions to a live plan markup application 1133.

The live metamodel plan 1141 is now a live-shared version of user metamodel plan file 1129 containing the static metamodel plan 1140 and transferred to the live plan markup app 1133.

The live user metamodel plan 1129 is checked out from the cloud plan file repository 1123 to the live user plan markup application 1133 for live editing user collaboration 1110. This is visualized by the thick arrow pointing from static metamodel plan 1129 to the live metamodel plan 1141.

The plan markup application 1133 allows multiple users 1110 to collaborate on the user metamodel plan 1129 file as a live plan metamodel file 1141. As shown in FIG. 10, live users 1110 can view a plan file 1006 in real-time and edit their own markups 1113.

The user admin 1101 is able to manage file version updates from the live metamodel plan 1141 by means of instantaneous file snapshot version updates back to the user metamodel plan 1129. This is visualized 1100 by the dashed arrow pointing back from the live plan 1141 to the user metamodel plan 1129.

The user metamodel plan 1129 can be copied and sent to the same live user plan markup application or a different markup application 1150 with a different metamodel 1140 This allows a single user building plan file 1102 to become any number of parallel collaboration reviews 1110 across a building's life cycle during the pre-construction, construction, operation and/or demolition phases.

Live users 1110 may create their own markups specific to each file 1141 in the markup application session 1133. Any markups created will be referenced through the markup metamodel 1146. Users can also insert their own markups 1113 and markup media 1114 as plan markup application plan objects 1147. Using this method, the live user markups are not actually modifying the user source plan 1124 which is stored for reference by the file repository 1123 and graph database 1136 relationships.

Live users 1110 may also dynamically add metadata to their markups based on the state metamodel 1020 preloaded into the user metamodel plan 1129.

In one or more embodiments of the present invention, the live plan markup application 1133 is connected to the building graph database 1136 by means of a continuous data API 1149. The data API may be a graphQL™ API service 1149 as part of a user building hypergraph API service 1115.

The live user metamodel plan file 1141 can remain shared within the live user plan markup application 1133 based on the objectives of the user admin 1101. The live user file session can remain as a continuous as-built plan markup service for any user building plan 1102.

A live user 1110 may be given electronic permission 1109 by the user admin 1101 to upload a building photo and/or video files 1118 through a live photo markup application 1150 which also provides both file, version and timestamp control for each user photo file 1151 within the building hypergraph service 1122.

Each user source photo 1151 may contain file metadata 1156 which may contain a combination of metadata 1156 values stored within the original user photo file 1118 or generated through an external markup app metamodel 1157.

Similar to the user building plan upload 1103 steps described previously, the uploaded 1117 user building photo file 1118 becomes a live user source photo 1151 stored within the live photo markup app 1150.

Live users 1110 can create markups as photo app markup objects 1160 as an overlay on the source photos 1151. The photo markup metamodel 1157 may be stored in the photo application 1150 and not within the photo file itself 1151.

One or more photo file 1151 and markup metadata 1153, 1156 may be exported into multiple structured image 1153 and/or tabular data file formats 1155, 1158, 1159, for example one or more of: CSV, XML and JSON into the graph database 1136.

In one or more embodiments of the present invention, the live photo markup application 1150 may both send and receive app markup metamodels 1157 and 2D/3D (x,y, z) object geometries 1158, 1159 with the graph building graph database 1136.

Within the process 1100 the graph database 1136 can receive structured file data 1134, 1135, 1137, 1139, 1142, 1148, 1152, 1154, 1155, 1158, 1159 CSV, XML or JSON file formats asynchronously as a continuous service when file or file markups are modified with applications connected within the user input data sources 1101, 1110, 1115 to the building markup plan-photo hypergraph service 1122.

In one or more embodiments of the present invention, live user collaboration 1110 on user admin 1101 metamodel plans 1141 and live user photos 1151 may be stored as relationships within a hypergraph database 1136 and accessed through a live graphQL™ data API service 1115. The data flow between the building hypergraph user API service 1115 and the graph database 1136 may be bidirectional through the GraphQL™ API 1149.

In a preferred embodiment, the user admin 1101 can administer the process 1000 as a collaborative service 1115 by means of a multi-administrator cloud integrated development environment (IDE) 1228 (See FIG. 12).

Having now provided an overview of FIG. 11A, FIG. 11B will now be described in more detail. Referring to FIG. 11B:

FIG. 11B is a callout description list of FIG. 11A.

Having now provided an overview of FIG. 11B, FIG. 12 will now be described in more detail. Referring to FIG. 12:

a. 1200—FIG. 12
b. 1202—Building knowledge hypergraph service
c. 1204—Graph Machine Learning and Artificial Intelligence Functions
d. 1206—GraphQL™ API data service
e. 1208—Graph triple-store database
f. 1210—User plan object data
g. 1210—User real object data
h. 1212—User virtual object data
i. 1214—User photo object data
j. 1216—User network object data
k. 1218—User IoT object data
l. 1220—User virtual object data
m. 1222—User live markup object geometry metadata
n. 1224—User BIM object data
o. 1226—User energy object data FIG. 12 shows an example of a building knowledge hypergraph service model as a visual embodiment.

In one or more embodiments of the present invention, live user building markup metadata collaboration 1222 from live user plans 1210 and live user photos 1214 is stored within a graph triplestore database 1208.

The building graph database 1208 is a significant improvement to traditional structured databases as a graph can contain combinations of data and data relationships through an extensible graph schema structure.

Using live shared user plan 1210 and photo files 1214 as input data sources enables building markup geometries to be linked between real 1212 and virtual objects 1220 across a number of complimentary building applications including: network 1216, IoT 1218, BIM 1224 and energy 1226 applications through relationships within a graph database 1208.

Furthermore a graphQL™ data API service 1206 enables graph machine learning and artificial intelligence APIs 1204 that can automatically benefit from the geometrically accurate graph database 1208 and relationships.

In a preferred embodiment, both graphQL™ 1206 and REST APIs are available and generated automatically within the building hypergraph data service 1202 based on the same graph database 1208.

With the graphQL™ API 1206, user live markup object building geometry 1222 can be linked to other live building databases to form hypergraph relationships between building files, markups and systems including networking 1216, Internet-of-Things (IoT) 1218, energy 1226 and BIM 1224 database sources as part of the live building hypergraph service 1202.

In a preferred embodiment, a visual hypergraph schema model 1200 may generate an accurate model representation for all system components over time.

The graphQL™ API 1206 service may enable data transfer between the graph database and 3rd party API applications which would benefit from live markup object geometries combined with knowledge graph relationships 1208 between multiple data sources continuous graph machine learning and artificial intelligence building service 1204.

Some Embodiments

One or more embodiments of the present invention may include one or more of the following as live markup hypergraph objects with one or more positions, one or more sizes and/or one or more viewport scales:

a. real-world environment plans, photos and videos;
b. virtual-world assets plans, photos and videos;
c. mobile machine plans, photos and videos;
d. scientific plans, photos and videos;
e. engineering plans, photos and videos;
f. economic plans, photos and videos;
g. hardware plans, photos and videos;
h. software plans, photos and videos;
i. art plans plans, photos and videos; and
j. technical plans, photos and videos, for example patent applications.

Certain embodiments of the invention disclosed herein are described using plan and/or photo files with PDF and JPEG formats, however one or more embodiments of the present invention may support multiple file types provided the files can be prepared and managed within the process.

Certain embodiments of the invention disclosed herein are described using a hypergraph database service using a graph triple-store database and graphQL™ API. However, one or more embodiments of the present invention may comprise SQL and no-SQL databases as an alternative or in addition to a graph triple-store database. Furthermore, one or more embodiments of the present invention may comprise a REST API as an alternative or in addition to a graphQL™ API.

Certain embodiments of the present invention provide: systems and methods for managing one or more digital building plan files and/or digital photo files as a live file markup metamodel collaboration and knowledge hypergraph service for new, existing or virtual building assets.

Certain embodiments of the present invention comprise: receiving, source-controlling, reading, preparing, managing and/or sharing user digital building plan files for live collaborative viewing and/or markup editing:

a. wherein the plan files comprise one or more files in an ISO standard open formats such as portable document format (PDF);
b. wherein the plan files comprise legal and/or informal building geometry drawing viewports created for the purpose of coordinating the construction, renovation, operation and/or demolition of materials, systems, equipment and/or objects within existing or new building assets; and
c. wherein the plan files may include one or more of: building, architecture, surveyor, electrical engineering, mechanical engineering, structural engineering, civil engineering, chemical engineering, scientific, landscape, planning, interior designer, manufacturing, agricultural, medical, aviation, transportation, consultant, general contractor, electrical contractor, mechanical contractor, IoT services, maintenance services, cleaning services, information technologies, and manufacturer plans and viewports, delivered as the output of building-related professional services and products.

Certain embodiments of the present invention comprise: receiving, source-controlling, reading, preparing, managing and/or sharing user building photo and/or video files for live collaborative markup viewing and/or editing;

a. wherein the photo and/or video files comprise one or more files of an ISO standard open format (such as JPEG); and
b. wherein the photo and/or video files comprise one or more files in both rectangular and/or spherical image formats.

Certain embodiments of the present invention comprise: receiving, storing, indexing and/or sharing plan and/or photo files and markup metadata as a live building knowledge hypergraph database service;

a. wherein the knowledge hypergraph database is a knowledge graph triple-store database;
b. wherein the knowledge hypergraph comprises a graphQL™ API service understandable in human and/or computer format; and
c. wherein the knowledge hypergraph database may be trained on one or more machine learning models.

Certain embodiments of the present invention comprise machine learning models may be trained on one or more of:

a. published user files;
b. unpublished user files;
c. published user markup object metadata;
d. unpublished user markup object metadata;
e. published API metadata models; and
f. unpublished API metadata models.

One or more embodiment of the present invention are described in the context of a building, or as installed in a building. In one or more embodiments:

- a "building" may include a contiguous and substantially enclosed structure containing a electrical and a telecommunication network, for example a condominium building, an office tower, a high-rise building, a mixed use development, a home, a structure and the like;
- a "building" may include two or more physically separate structures, wherein an electrical or optical network is shared between the separate structures, for example a building with an optical line terminal that provides optical connectivity to an optical network terminal located within a separate structure and/or one or more outdoor renewable power supplies like solar panels, wind turbines, and the like;
- a "building" may include natural or human-made structures that do not necessarily have fabricated walls such as bridges, dams, tunnels, roadways, poles, parking lots, and the like;
- a "building" may include mobile structures that may switch between stationary or mobile modes of operation for example: telecom cabinets, shipping containers or self-powered vehicles, and the like; and
- a "building" can be of any location and size provided it may contain an optical line terminal or an optical network terminal, and the like.

Interpretation of Terms

Unless the context clearly requires otherwise, throughout the description and the

- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, optical computers, optical networks, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, PDAs, color-grading tools, video projectors, audio-visual receivers, displays (such as televisions), digital cinema projectors, media players, and other devices suitable for the purposes described herein. Those skilled in the relevant art will appreciate that aspects of the system can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics (e.g., video projectors, audio-visual receivers, displays, such as televisions, and the like), set-top boxes, color-grading tools, network PCs, mini-computers, mainframe computers, and the like.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. A method for providing concurrent multi-user access to a building representation markup hypergraph, the method comprising:
   - receiving a building representation, wherein the building representation comprises at least one of a building plan file and a building photograph file;
   - generating a processed building representation from the building representation;
   - receiving building representation markup data, wherein the markup data includes at least one markup object with geometric metadata;
   - generating a hypergraph based at least in part on the processed building representation and the representation markup data, wherein the hypergraph comprises a graph database having a plurality of nodes and one or more edges, wherein:
     - a first of the nodes represents the building representation;
     - a second of the nodes represents one of the markup objects; and
     - a first one of the edges represents a relationship between the first of the nodes and the second of the nodes;
   - receiving, from a first user, a first access request requesting access to the first of the nodes;
   - in response to receiving the first access request, providing access to the first of the nodes to the first user;
   - receiving, from a second user, a second access request requesting access to either the second of the nodes or the first one of the edges; and
   - in response to receiving the second access request;
     - verifying the second access request is requesting access to a distinct node or edge of the hypergraph than the first access request; and
     - providing access to the hypergraph to the second user concurrent with providing access to the hypergraph to the first user;
   - wherein the building representation comprises the building plan file, and generating the processed building representation comprises:
     - converting the building plan file to a user source plan file;
     - storing the user source plan file in a source-controlled plan file repository; and
   - receiving the building representation markup data comprises:
     - extracting one or more static plan images, one or more markup objects, and file metadata from the user source plan file;
     - extracting one or more relationships between one or more of the static plan images, markup objects, and file metadata; and
   - generating the hypergraph comprises storing the static plan images as one or more nodes in the hypergraph, the markup objects as one or more nodes in the hypergraph, the file metadata as one or more nodes in the hypergraph, and the relationships as one or more edges in the hypergraph.

2. The method according to claim 1, wherein providing access to the hypergraph to the first user comprises providing access with a GraphQL™ application programing interface (API).

3. The method according to claim 2, wherein providing access to the hypergraph to the second user comprises providing access with the GraphQL™ API.

4. The method according to claim 1, wherein extracting the static plan images, markup objects, and file metadata from the user source plan file comprises extracting the static plan images, markup objects, and file metadata from the user source plan file with an application program interface (API) script.

5. The method according to claim 4, wherein extracting the relationships between one or more of the static plan images, markup objects, and file metadata comprises extracting the relationships between one or more of the static plan images, markup objects, and file metadata with the application program interface (API) script.

6. The method according to claim 5, wherein:
   - providing access to the hypergraph to the first user comprises providing access to one or more of the static plan images, markup objects, file metadata, and relationships to the first user; and
   - providing access to the hypergraph to the second user comprises providing access to one or more of the static plan images, markup objects, file metadata, and relationships to the second user.

7. The method according to claim 6, wherein the first access request comprises a request to edit the markup data, and providing access to the hypergraph to the first user comprises:
   - receiving first updated markup data from the first user; and
   - updating one or more of the static plan images, the markup objects, the file metadata, and the relationships based at least in part on the first updated markup data.

8. The method according to claim 7, wherein the second access request comprises a request to edit the markup data, and providing access to the hypergraph to the second user comprises:
   - receiving second updated markup data from the second user; and
   - updating one or more of the static plan images, the markup objects, the file metadata, and the relationships based at least in part on the second updated markup data.

9. The method according to claim 1, wherein providing access to the hypergraph to the first user comprises:
   - generating a user metamodel plan file from the building representation;
   - storing the user metamodel plan file in a cloud file storage repository; and
   - providing access to the first user to the user metamodel plan file.

10. The method according to claim 9, further comprising:
   - generating one or more metadata models from the user metamodel plan file using one or more plan file functions;
   - generating one or more markup objects from the building representation markup data; and
   - adding each of the markup objects to the user metamodel plan file;
   - wherein providing access to the hypergraph to the first user comprises providing access to one or more of the markup objects to the first user.

11. The method according to claim 10, wherein providing access to the markup objects to the first user comprises:

receiving updated markup data from the first user;

updating one or more of the markup objects based at least in part on the updated markup data to generate updated markup objects; and updating the hypergraph based at least in part on the updated markup objects.

12. The method according to claim 11, wherein providing access to the hypergraph to the second user comprises providing access to the second user to the user metamodel plan file.

13. The method according to claim 12, wherein providing access to the hypergraph to the second user comprises providing access to one or more of the markup objects to the second user.

14. The method according to claim 13, wherein providing access to the markup objects to the second user comprises:

receiving updated markup data from the second user;

updating one or more of the markup objects based at least in part on the updated markup data to generate updated markup objects; and updating the hypergraph based at least in part on the updated markup objects.

15. The method according to claim 1, wherein the building representation comprises one or more of: a building plan file, and a building photograph file.

16. The method according to claim 1, wherein the hypergraph comprises one or more of:

a static plan image;

a markup stream object, wherein the object comprises a document geometry and a property value;

a markup properties model;

a space polygon area model;

a viewport scale model;

a page label model; and a page geometry model.

17. The method according to claim 1, wherein the markup objects comprise one or more of:

real-world environment plans;

real-world environment photos and/or videos;

virtual-world assets plans;

virtual-world assets photos and/or videos;

mobile machine plans;

mobile machine photos and/or videos;

scientific plans;

scientific photos and/or videos;

engineering plans;

engineering photos and/or videos;

economic plans;

economic photos and/or videos;

hardware plans;

hardware photos and/or videos;

software plans;

software photos and/or videos;

art plans;

art photos and/or videos;

technical plans, for example patent applications; and technical photos and/or videos.

18. The method according to claim 1, wherein the building representation comprises one or more of:

one or more files in an ISO™ standard open format such as portable document format (PDF);

legal building geometry drawing viewports created for the purpose of coordinating one or more of: construction, renovation, operation and demolition of one or more of: materials, systems, equipment and objects within existing or new building assets;

informal building geometry drawing viewports created for the purpose of coordinating one or more of: construction, renovation, operation and demolition of one or more of: materials, systems, equipment and objects within existing or new building assets; and one or more outputs from building-related professional services or products, including one or more of: building plans and viewports, architecture plans and viewports, surveyor plans and viewports, electrical engineering plans and viewports, mechanical engineering plans and viewports, structural engineering plans and viewports, civil engineering plans and viewports, chemical engineering plans and viewports, scientific plans and viewports, landscape plans and viewports, planning plans and viewports, interior designer plans and viewports, manufacturing plans and viewports, agricultural plans and viewports, medical plans and viewports, aviation plans and viewports, transportation plans and viewports, consultant plans and viewports, general contractor plans and viewports, electrical contractor plans and viewports, mechanical contractor plans and viewports, IoT services plans and viewports, maintenance services plans and viewports, cleaning services plans and viewports, information technologies plans and viewports, and manufacturer plans and viewports.

19. The method according to claim 1, wherein the hypergraph comprises one or more of:

a knowledge graph triple-store database;

a human readable graphQL™ application programming interface (API) service;

a computer readable graphQL™ application programming interface (API) service; and one or more machine learning models trained on data and relationships otherwise stored in the hypergraph.

* * * * *